United States Patent
Dimitrova et al.

(10) Patent No.: US 12,079,166 B2
(45) Date of Patent: Sep. 3, 2024

(54) FILE SELECTION USER INTERFACE

(71) Applicant: MICROSOFT TECHNOLOGY LICENSING, LLC, Redmond, WA (US)

(72) Inventors: Daniela Dimitrova, Redmond, WA (US); Christopher Wymer, Valley View, OH (US); Elijah A. Waalkes, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/722,633

(22) Filed: Apr. 18, 2022

(65) Prior Publication Data
US 2023/0334018 A1    Oct. 19, 2023

(51) Int. Cl.
*G06F 16/16*     (2019.01)
*G06F 3/0484*    (2022.01)
*G06F 16/176*    (2019.01)

(52) U.S. Cl.
CPC .......... *G06F 16/168* (2019.01); *G06F 3/0484* (2013.01); *G06F 16/176* (2019.01)

(58) Field of Classification Search
None
See application file for complete search history.

(56) References Cited

U.S. PATENT DOCUMENTS

| | | | |
|---|---|---|---|
| 7,536,386 B2 * | 5/2009 | Samji | G06F 16/168 713/168 |
| 7,565,618 B2 * | 7/2009 | Sheasby | G06F 3/0486 715/769 |
| 8,548,992 B2 | 10/2013 | Abramoff et al. | |

(Continued)

FOREIGN PATENT DOCUMENTS

WO    2017008646 A1    1/2017

OTHER PUBLICATIONS

"Share OneDrive files and folders", Retrieved From: https://web.archive.org/web/20220121032651/https://support.microsoft.com/en-us/office/share-onedrive-files-and-folders-9fcc2f7d-de0c-4cec-93b0-a82024800c07, Jan. 21, 2022, 6 pages.

(Continued)

*Primary Examiner* — Henry Orr
(74) *Attorney, Agent, or Firm* — Newport IP, LLC; Jacob P. Rohwer

(57) ABSTRACT

A file selection user interface (UI) includes a navigation area and a holding area. The navigation area enables a user to navigate between storage locations provided by the file hosting service. Visual representations of files stored by the file hosting service are displayed in the navigation area. The holding area provides a temporary storage area for files upon which one or more operations are to be performed. A user might provide input that causes visual representations of files shown in the navigation area to be added to the holding area. Once the desired files have been added to the holding area, the user may provide user input requesting that the file (Continued)

hosting service perform one or more operations on the files represented in the holding area. In response thereto, the file hosting service can cause the requested operations to be performed on the files represented in the holding area.

15 Claims, 19 Drawing Sheets

(56) References Cited

U.S. PATENT DOCUMENTS

| | | | |
|---|---|---|---|
| 8,555,187 B2 * | 10/2013 | Margolin | H04L 67/10 |
| | | | 715/770 |
| 8,688,750 B2 | 4/2014 | Evans et al. | |
| 9,513,770 B1 * | 12/2016 | Sun | H04M 1/27475 |
| 10,536,513 B2 * | 1/2020 | Newman | H04L 67/01 |
| 10,627,993 B2 * | 4/2020 | Worley | G06F 3/0486 |
| 11,050,851 B2 * | 6/2021 | Antipa | G06F 3/048 |
| 11,556,241 B2 * | 1/2023 | Polyulya | G06F 3/04883 |
| 2012/0110486 A1 * | 5/2012 | Sirpal | G06F 3/0482 |
| | | | 715/770 |
| 2013/0282830 A1 * | 10/2013 | Besen | G06F 16/185 |
| | | | 709/205 |
| 2013/0346491 A1 * | 12/2013 | Margolin | H04L 67/10 |
| | | | 709/203 |
| 2014/0157169 A1 * | 6/2014 | Kikin-gil | G06F 3/04886 |
| | | | 715/770 |
| 2015/0178007 A1 * | 6/2015 | Moisa | H04L 67/1097 |
| | | | 713/190 |
| 2016/0162700 A1 * | 6/2016 | Kulkarni | H04L 63/10 |
| | | | 726/28 |
| 2017/0171125 A1 * | 6/2017 | Chow | H04L 67/06 |
| 2018/0107676 A1 | 4/2018 | Vora | |
| 2018/0146029 A1 * | 5/2018 | Newman | G06F 21/629 |
| 2018/0336234 A1 | 11/2018 | JÅtzold et al. | |

OTHER PUBLICATIONS

Hasan, et al., "AirPanes: Two-Handed Around-Device Interaction for Pane Switching on Smartphones", In Proceedings of the CHI Conference on Human Factors in Computing Systems, May 6, 2017, 13 Pages.

Shafer, et al., "The Third Project: Creating a New Pane Type", In Proceedings of Practical Smalltalk, 1991, pp. 99-128.

"Yoink for Mac", Retreived From: https://eternalstorms.at/yoink/mac/, Apr. 14, 2022, 7 pages.

"International Search Report and Written Opinion Issued in PCT Application No. PCT/US23/012077", Mailed Date: Apr. 18, 2023, 11 Pages.

* cited by examiner

FILE SELECTION USER INTERFACE

BACKGROUND

File hosting services, which are sometimes referred to as cloud storage services, provide functionality for enabling users to store electronic files and access the files via the internet. Typically, a user will upload files to such a service which they can then access after authenticating with the service. File hosting services might also provide other types of functionality such as, for example, allowing users to organize their files, such as by creating albums of digital photos or a tree structure of file folders, and allowing users to share files with other users.

User interfaces for organizing, sharing, and performing other types of operations on files provided by file hosting services can sometimes be cumbersome for users. For example, a user might want to share multiple digital photos stored by a file hosting service with a friend or group of friends. The digital photos might be taken on different dates, might be stored in different albums, or might be located in separate folders.

Because the files in the example described above are in different locations, the user will typically have to perform multiple operations in order to share the files. For instance, the user might have to share files in different locations separately or create anew album with the files and share the new album with the other users. Such a sequence of operations can be tedious for users to perform and, consequently, can make inefficient use of computing resources, such as processor cycles, memory, storage, and power.

As another example, a user of a file hosting service might want to share a document along with a few supporting digital photos. These items may be located in different folders provided by the file hosting service. In this example, the user may have to share the document first and then perform separate operations to navigate to the locations of the digital photos and then share the digital photos. As in the example described above, this sequence of operations can be tedious for users and make inefficient user of computing resources such as those described above.

It is with respect to these and other technical challenges that the disclosure made herein is presented.

SUMMARY

Technologies are disclosed herein for providing a file selection user interface ("UI"). Through implementations of the disclosed technologies, a file selection UI is provided that streamlines the process of selecting multiple files stored in different locations by a file hosting service and performing one or more operations on the selected files.

Implementations of the disclosed technologies can reduce the number of user operations required to perform operations on files stored in different locations by a file hosting service. This, in turn, can reduce the utilization of computing resources, such as memory and processor cycles, by computing devices implementing the disclosed technologies. Other technical benefits not specifically mentioned herein can also be realized through implementations of the disclosed subject matter.

According to various embodiments, the disclosed file selection UI can include a first portion, which may be referred to herein as the "navigation area," and a second portion, which may be referred to herein as the "holding area." Visual representations of files stored by a file hosting service can be displayed in the navigation area. For example, and without limitation, icons or thumbnail images corresponding to files stored by a file hosting service might be displayed in the navigation area.

The navigation area also provides functionality for enabling a user to navigate between storage locations provided by the file hosting service. For instance, the navigation area may provide functionality for enabling a user to navigate between folders, albums, and other locations provided by the file hosting service. Visual representations of the files in the currently selected location are displayed in the navigation area.

The holding area of the file selection UI provides a temporary storage area for files upon which an operation, or operations, are to be performed. In particular, a user might provide user input that causes a visual representation of a file shown in the navigation area to be added to the holding area. In one specific implementation, for instance, a user might perform a drag and drop operation whereby a visual representation of a file shown in the navigation area is selected, dragged, and dropped into the holding area.

In response to such an operation, the visual representation of the file is shown in the holding area and a reference to the file, such as a hyperlink, a globally unique identifier ("GUID"), path, or file system identifier, is stored. In some embodiments, such as those implemented in conjunction with small screen devices like smartphones, the holding area of the file selection UI may be hidden until a user selects or drags visual representations of files displayed in the navigation area.

Subsequently, a user might utilize the navigation area to navigate to a second location maintained by the file hosting service. In response thereto, visual representations corresponding to files stored in the second location are displayed in the navigation area. The user may then utilize the mechanism described above to add visual representations of one or more files stored in the second location to the holding area. As described above, visual representations of the files are then displayed in the holding area and references to the files are stored.

The process described above may be repeated for multiple storage locations until the user has added visual representations to the holding area for all of the files they desire to perform an operation on. The files may be of different types, and, in some embodiments, entire folders of files may be added to the holding area in the manner described above. Functionality can also be provided for removing visual representations of files from the holding area so that operations will not be performed on those files. When a visual representation of a file is removed from the holding area, the previously stored reference to that file is also deleted.

Once the user has added the desired files to the holding area, the user may provide user input requesting that the file hosting service perform one or more operations on the files represented by the stored references (i.e., the files having visual representations displayed in the holding area). In response thereto, the file hosting service can cause the requested operations to be performed on the files represented in the holding area.

The operations performed by the file hosting service on files represented in the holding area can include file operations such as, but not limited to, copying or moving files to a specified destination location, or locations, provided by the file hosting service, deleting files, or other types of file operations. The operations performed by the file hosting service on files represented in the holding area can also include sharing operations such as, but not limited to, operations for sharing the files in a communication session, in an album, on a social network, or in another manner.

The operations performed by the file hosting service on files represented in the holding area can also include messaging operations such as, but not limited to, causing a message to be transmitted to one or more other users along with the files. For instance, files represented in the holding area might be attached to an electronic mail message, an instant message, or another type of message. The operations performed by the file hosting service on files represented in the holding area can also include organizing operations such as, but not limited to, copying or moving the files to other locations maintained by the file hosting service, such as an album or a folder.

As discussed briefly above, implementations of the technologies disclosed herein provide various technical benefits such as, but not limited to, reducing the number of operations that need to be performed by a user in order to select and perform operations on files that are in different locations maintained by a file hosting service. This, in turn, can reduce the utilization of computing resources, such as memory and processor cycles, by computing devices implementing aspects of the disclosed subject matter. Other technical benefits not specifically identified herein can also be realized through implementations of the disclosed technologies.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
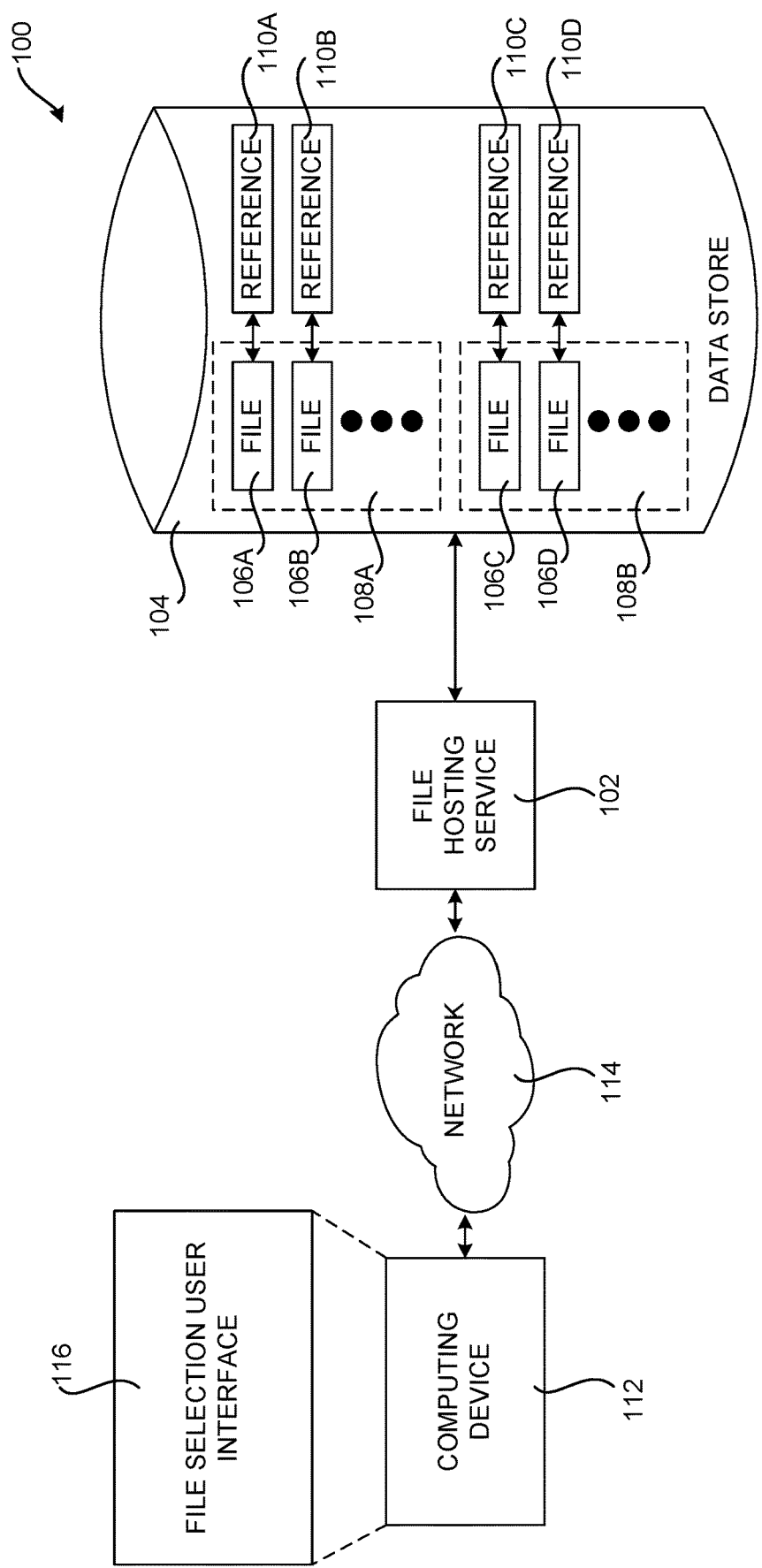
FIG. 1 is a network architecture diagram showing aspects of one illustrative operating environment for the various embodiments disclosed herein.

The following detailed description is directed to technologies for providing a file selection UI. As discussed briefly above, various technical benefits can be realized through implementations of the disclosed technologies such as, but not limited to, reducing the number of operations that need to be performed by a user in order to select and perform operations on files that are in different locations maintained by a file hosting service. This, in turn, can reduce the utilization of computing resources, such as memory and processor cycles, by computing devices implementing aspects of the disclosed subject matter. Other technical benefits not specifically mentioned herein can also be realized through implementations of the disclosed subject matter.

While the subject matter described herein is presented in the general context of a desktop, laptop, smartphone, or tablet computing device configured for providing a file selection UI, those skilled in the art will recognize that other implementations can be performed in combination with other types of computing devices, systems, and modules. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearable computing devices, automobiles, home automation, etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for providing a file selection UI will be described.

FIG. 1 is a network architecture diagram showing aspects of one illustrative operating environment for the various embodiments disclosed herein. As shown in FIG. 1, a file hosting service 102 provides functionality for enabling users to store electronic files 106 and access the files via a network 114, such as the internet. In order to utilize aspects of the functionality provided by the file hosting service 102, a user will typically utilize a computing device 112 to upload files 106 to the file hosting service 102. The user can then access the files 106 from the computing device 112, or another computing device, after authenticating with the file hosting service 102.

The file hosting service 102 might also provide other types of functionality such as, for example, allowing users to organize their files 106, such as by creating albums of digital photos or a tree structure of file folders, and allowing users to share files 106 or folders with other users. Consequently, files 106 maintained by the file hosting service 102 may be stored in or associated with different locations 108. In the example shown in FIG. 1, for instance, the files 106A and 106B are associated with the location 108A and the files 106C and 106D are associated with the location 108B.

As shown in FIG. 1, the file hosting service 102 might store the files in one or more appropriate data stores 104. The file hosting service 102 might also maintain references 110A-110C to the files 106A-106C, respectively. A reference 110 may be a hyperlink, a GUID, a file system path, another type of file system identifier, or another type of reference that uniquely identifies a file 106 maintained by the file hosting service 102.

As also shown in FIG. 1, the file hosting service 102 also provides a file selection UI 116 that provides functionality for enabling a user to select multiple files 106 stored in different locations 108 by the file hosting service 102 and to perform one or more operations on the selected files 106. In one embodiment, the file hosting service 102 provides the file selection UI 116 by way of a web browser application (not shown in FIG. 1) executing on the computing device 112. In other embodiments, the file selection UI 116 is provided by a file hosting service client application (also not shown in FIG. 1) executing on the computing device 112. The file selection UI 116 might be provided by an operating system or another component executing on the computing device 112 in other embodiments.

Figure 2:
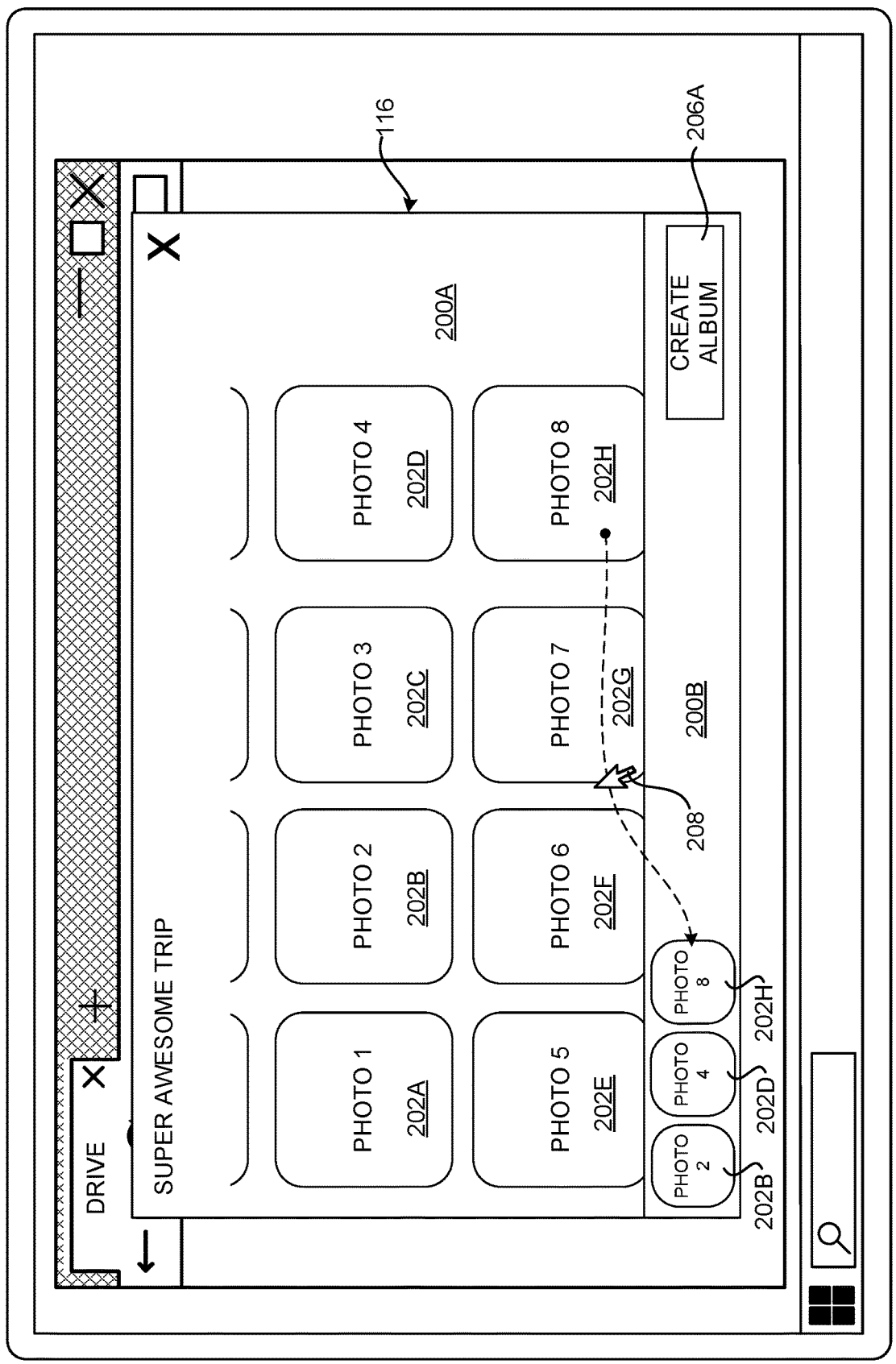
FIG. 2 is a UI diagram illustrating aspects of a file selection UI, according to one embodiment disclosed herein.

FIG. 2 is a UI diagram illustrating aspects of the file selection UI 116, according to one embodiment disclosed herein. As shown in FIG. 2, the file selection UI 116 can include a first portion, which may be referred to herein as the navigation area 200A, and a second portion, which may be referred to herein as the holding area 200B.

Visual representations 202 of files 106 stored by the file hosting service 102 can be displayed in the navigation area 200A. For example, and without limitation, icons or thumbnail images corresponding to files 106 stored by the file hosting service 102 might be displayed in the navigation area 200A. In the example shown in FIG. 2, visual representations 202A-202H are shown in the navigation area 200A. The visual representations 202A-202H correspond to files 106 stored in or associated with a location 108 provided by the file hosting service 102.

The navigation area 200A also provides functionality for enabling a user to navigate between storage locations 108 provided by the file hosting service 102. For instance, the navigation area 200A may provide functionality for enabling a user to navigate between folders, albums, and other locations provided by the file hosting service 102. Visual representations 202 of the files 106 in the currently selected location 108 are displayed in the navigation area 200A.

The holding area 200B of the file selection UI 102 provides a temporary storage area for files 106 upon which an operation, or operations, are to be performed. In particular, a user might provide user input that causes a visual representation 202 of a file 106 shown in the navigation area 200A to be added to the holding area 200B. In the illustrated example, for instance, a user is performing a drag and drop operation using the cursor 208 and a suitable user input device.

Through the drag and drop operation, the visual representation 202H of a file 106 shown in the navigation area 200A is selected, dragged, and dropped into the holding area 200B. In the illustrated example, the user has previously dragged and dropped the visual representations 202B and 202D to the holding area 200B. In this regard, it is to be appreciated that user input other than a drag and drop operation can be utilized to initiate the functionality disclosed herein. For example, and without limitation, in some embodiments a user might select a visual representation 202 and then select a menu item or provide keyboard input to initiate adding the selected visual representation 202 to the holding area 200B. Other types of user input can be utilized in other embodiments.

In response to the drag and drop operation illustrated in FIG. 2 (or another type of user input as described above), the visual representation 202H of the corresponding file 106 is shown in the holding area 200A and a reference 110 to the file 106 is stored. The reference 110 might be stored in memory or on disk in various embodiments.

Subsequently, a user might utilize the navigation area 200A to navigate to a second location 108 maintained by the file hosting service 108. In response thereto, visual representations 202 corresponding to files 106 stored in the second location 108 are displayed in the navigation area 200A. The user may then utilize the mechanism described above to add visual representations 202 of one or more files 106 stored in the second location 108 to the holding area 200B. As described above, visual representations 202 of the files 106 are then displayed in the holding area 200B and references 110 to the files 106 are stored.

The process described above may be repeated for multiple storage locations 108 until the user has added visual representations 202 to the holding area 200B for all of the files 106 they desire to perform an operation, or operations, on. The files 106 may be of different types, and, in some embodiments, entire folders of files 106 may be added to the holding area 200A in the manner described above.

As discussed in greater detail below, functionality can also be provided for removing visual representations 202 of files 106 from the holding area 200B so that operations will not be performed on those files 106. When a visual representation 202 of a file 106 is removed from the holding area 200B, the previously stored reference 110 to that file 106 is also deleted.

Once the user has added the visual representations 202 corresponding to the desired files 106 to the holding area 200B, the user may provide user input requesting that the file hosting service 102 perform one or more operations on the files 106 represented by the previously stored references 110 (i.e., the files 106 having visual representations 202 displayed in the holding area 200B). In response thereto, the file hosting service 102 can cause the requested operations to be performed on the files 106 represented in the holding area 200B.

The operations performed by the file hosting service 102 on files represented in the holding area 200B can include organizing operations such as, but not limited to, copying or moving the represented files 106 to other locations 108 maintained by the file hosting service 102, such as an album or a folder. In the example shown in FIG. 2, for instance, a user might select the UI control 206A in order to cause the file hosting service 102 to create a new album that includes the files 106 represented by the visual representations 202B, 202D, and 202H in the holding area 200B The operations performed by the file hosting service 102 on files 106 represented in the holding area 200B can also include file operations such as, but not limited to, copying or moving files 106 to a specified destination location 108, or locations 108, provided by the file hosting service 102, deleting files 106, or other types of file operations. The operations performed by the file hosting service 102 on files 106 represented in the holding area 200B can also include sharing operations such as, but not limited to, operations for sharing the files 106 in a communication session, in an album, on a social network, or in another manner.

The operations performed by the file hosting service 102 on files 106 represented in the holding area 200B can also include messaging operations such as, but not limited to, causing a message to be transmitted to one or more other users along with the files 106. For instance, files 106 represented in the holding area 200B might be attached to an electronic mail message, an instant message, or another type of message. Additional details regarding the functionality provided by the file selection UI 116 and the various operations that can be initiated through the file selection UI 116 will be provided below with regard to FIGS. 3A-7.

Figure 3A:
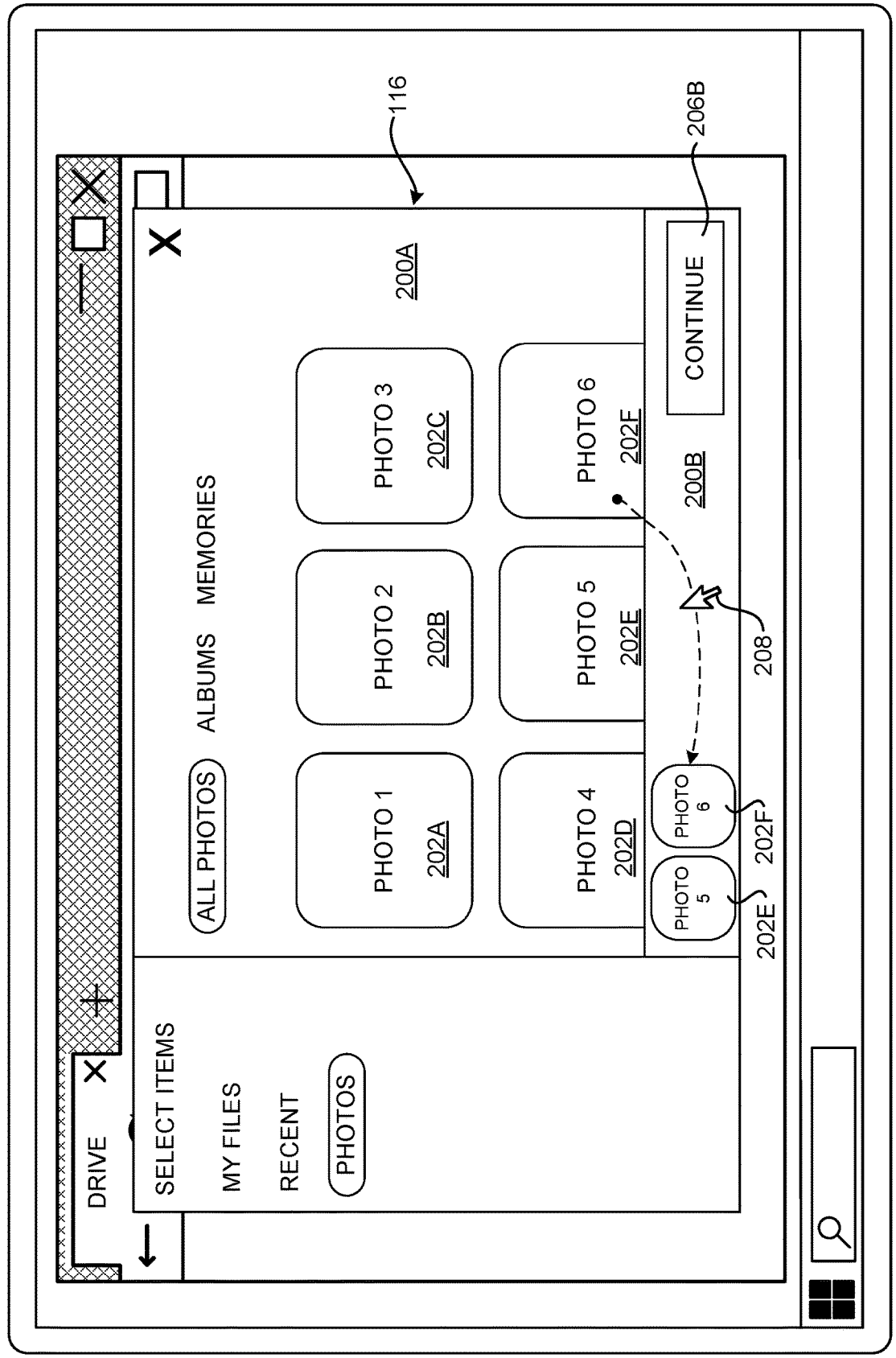
FIG. 3A is a UI diagram illustrating aspects of a file selection UI for selecting digital photos in different locations maintained by a file hosting service, according to one embodiment disclosed herein.
Figure 3B:
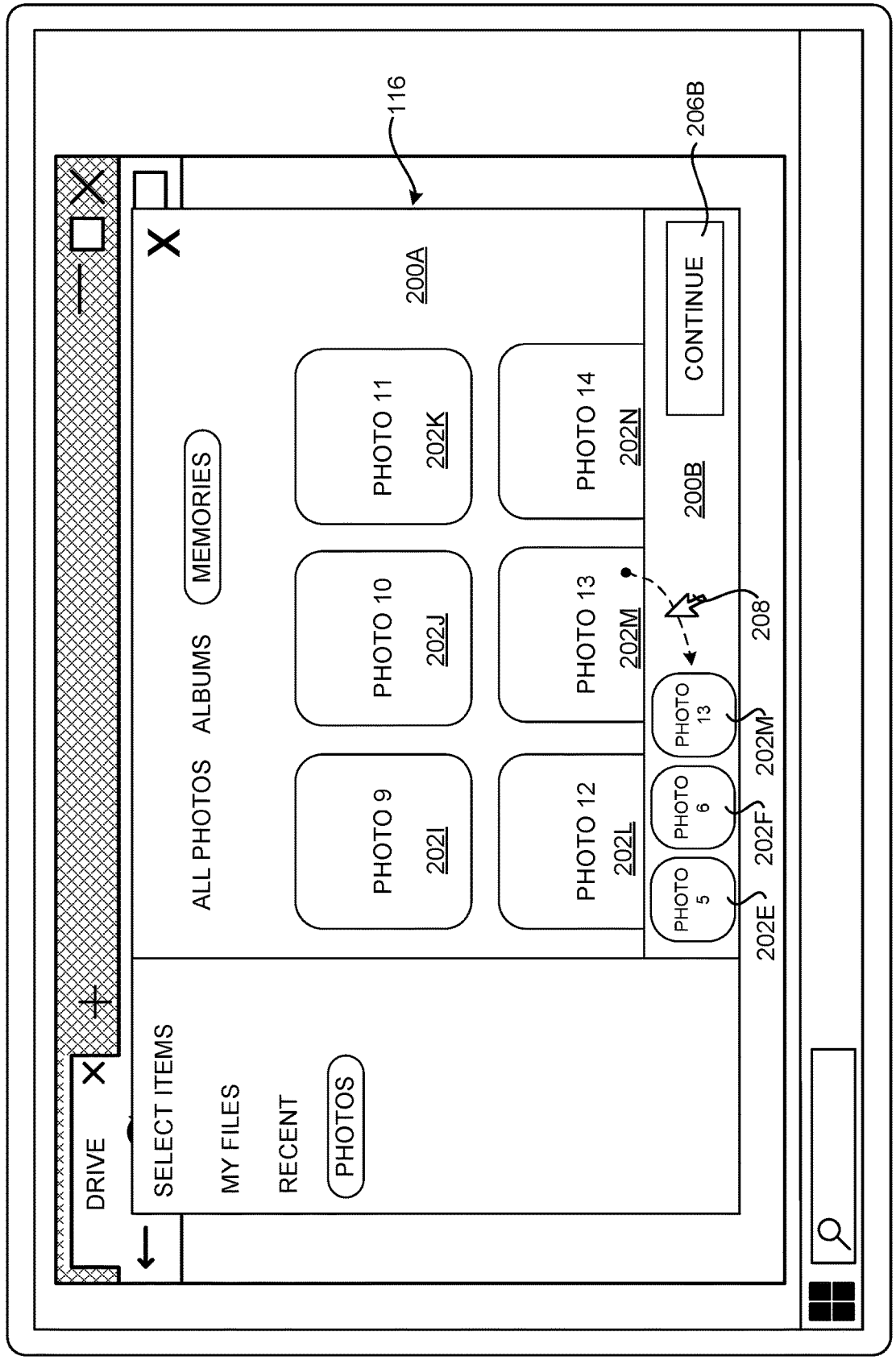
FIG. 3B is a UI diagram illustrating aspects of a file selection UI for selecting digital photos in different locations maintained by a file hosting service, according to one embodiment disclosed herein.
Figure 3C:
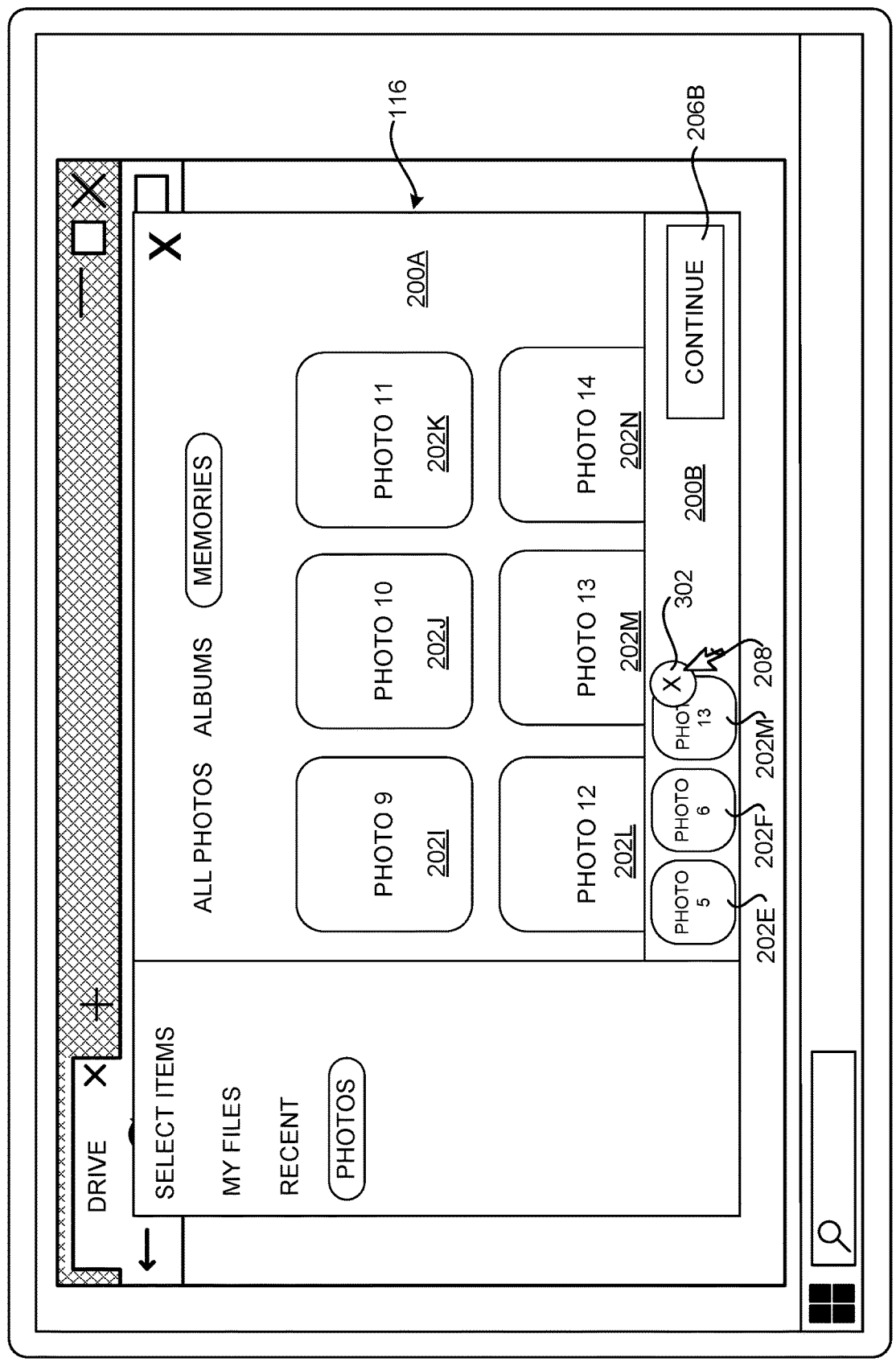
FIG. 3C is a UI diagram illustrating aspects of a file selection UI for selecting digital photos in different locations maintained by a file hosting service, according to one embodiment disclosed herein.

FIGS. 3A-3C are UI diagrams illustrating aspects of the file selection UI 116 for selecting digital photos in different locations 108 maintained by the file hosting service 102, according to one embodiment disclosed herein. In the example shown in FIGS. 3A-3C, a user of the computing device 112 has utilized the navigation area 200A of the file selection UI 116 to navigate to a location 108 provided by the file hosting service 102 called "All Photos." In response thereto, visual representations 202A-202F corresponding to files 106 in the selected location are presented in the navigation area 200A.

As shown in FIG. 3A, the user in the illustrated example has also utilized a cursor 208 and an appropriate user input device, such as a mouse or touchpad, to drag and drop visual representations 202E and 202F from the navigation area 200A to the holding area 200B. Subsequently, and as illustrated in FIG. 3B, the user has provided user input to the navigation area 200A to navigate to a second location 108 provided by the file hosting service 102 called "Memories." Thereafter, the user has utilized the cursor 208 and an appropriate user input device to drag the visual representation 202M to the holding area 200B. Accordingly, visual representations 202E, 202F, and 202M are shown in the holding area 200B and references 110 to the corresponding files have been stored.

As discussed briefly above, the file selection UI 116 can also provide functionality for removing visual representations 202 of files 106 from the holding area 200B so that operations will not be performed on those files 106. When a visual representation 202 of a file 106 is removed from the holding area 200B, the previously stored reference 110 to that file 106 is also deleted.

Continuing the example from FIGS. 3A and 3B, a user might utilize the cursor 208 and an appropriate user input device to hover over one of the visual representations 202, in this case the visual representation 202M. The user might utilize other types of user input to select a visual representation 202. In response thereto, a UI control 302 has been displayed adjacent to the visual representation 202M. The user can select the UI control 302 utilizing the cursor 302 in order to request that the visual representation 202M be deleted from the holding area 200B. In response thereto, the visual representation 202M is deleted from the holding area 200B and the reference 110 to the corresponding file is deleted.

The process described above with regard to FIGS. 3A-3C may be repeated for multiple storage locations 108 until the user has added visual representations 202 to the holding area 200B for all of the files 106 they desire to perform an operation, or operations, on. Once the user has added the visual representations 202 corresponding to the desired files 106 to the holding area 200B, the user may provide user input requesting that the file hosting service 102 perform one or more operations on the files 106 represented by the previously stored references 110. For instance, the user might select the UI control 206B.

After selecting the UI control 206B, the user might be asked to select the operation, or operations, to be performed on the files 106 represented by the visual representations 202 in the holding area 202B. Once the user has made their selection, the file hosting service 102 can cause the requested operations to be performed on the files 106 represented in the holding area 200B.

Figure 4A:
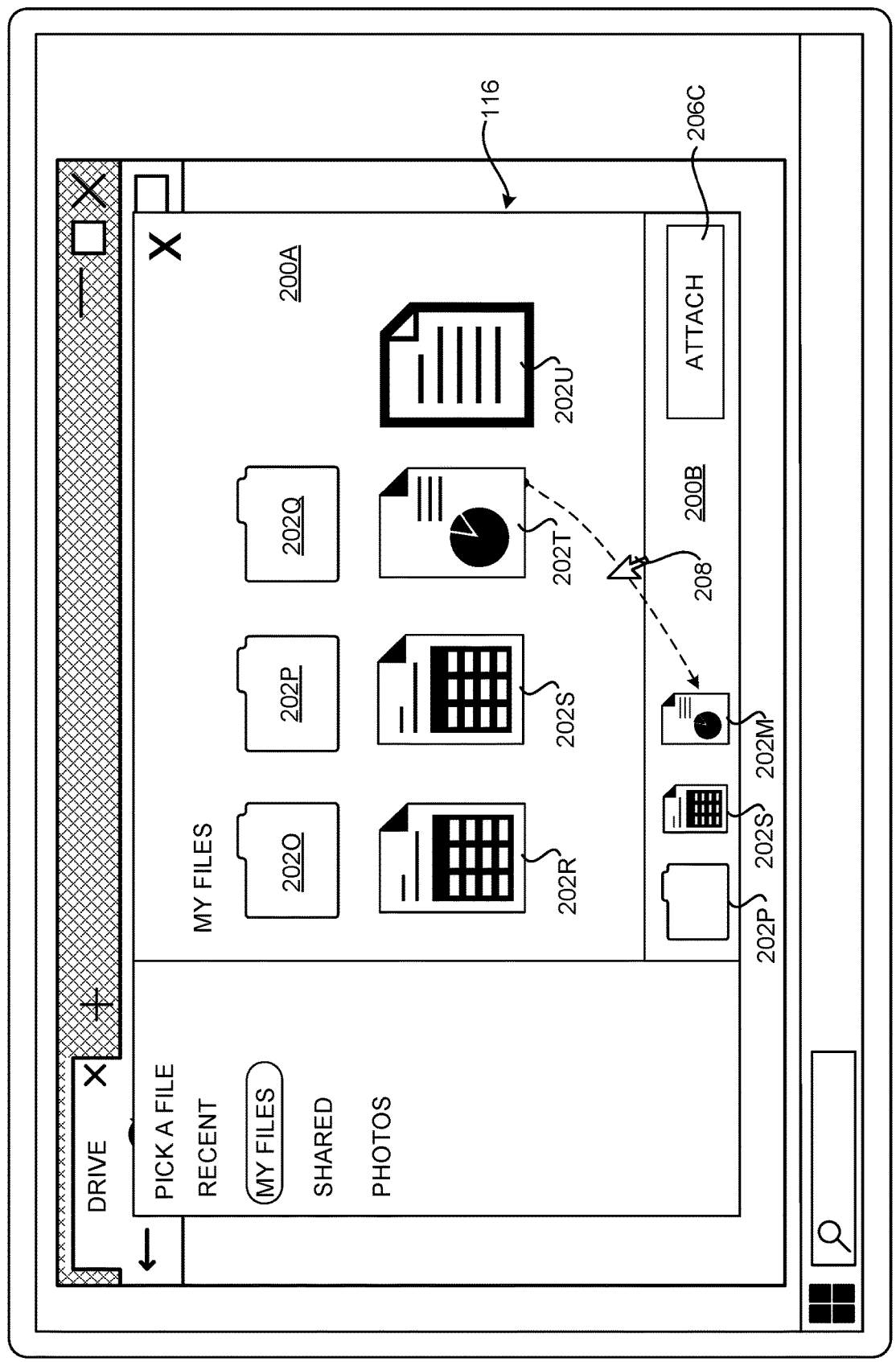
FIG. 4A is a UI diagram illustrating aspects of a file selection UI for selecting files of different types in different locations maintained by a file hosting service for performing a messaging operation, according to one embodiment disclosed herein.
Figure 4B:
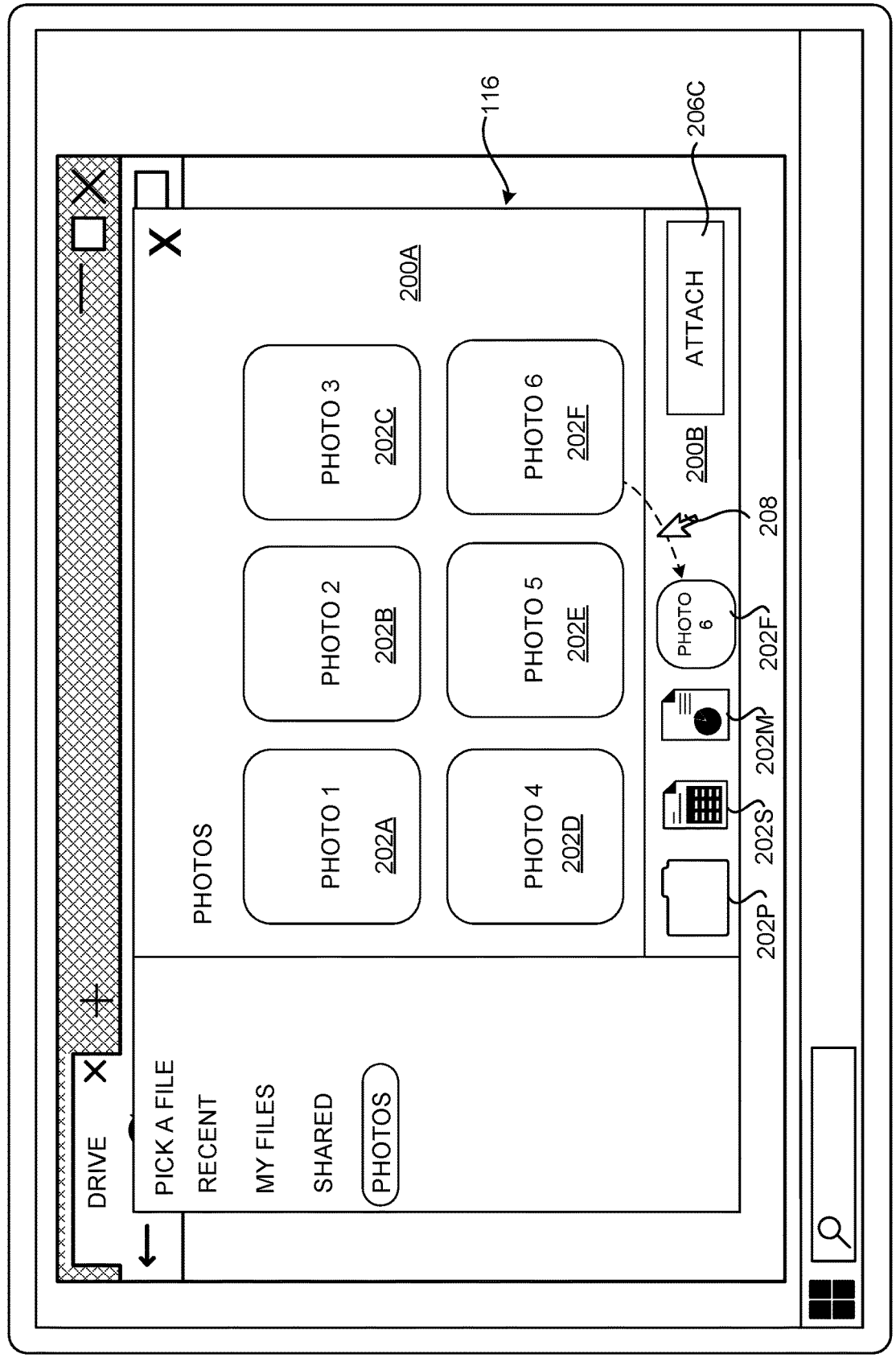
FIG. 4B is a UI diagram illustrating aspects of a file selection UI for selecting files of different types in different locations maintained by a file hosting service for performing a sharing operation, according to one embodiment disclosed herein.
Figure 4C:
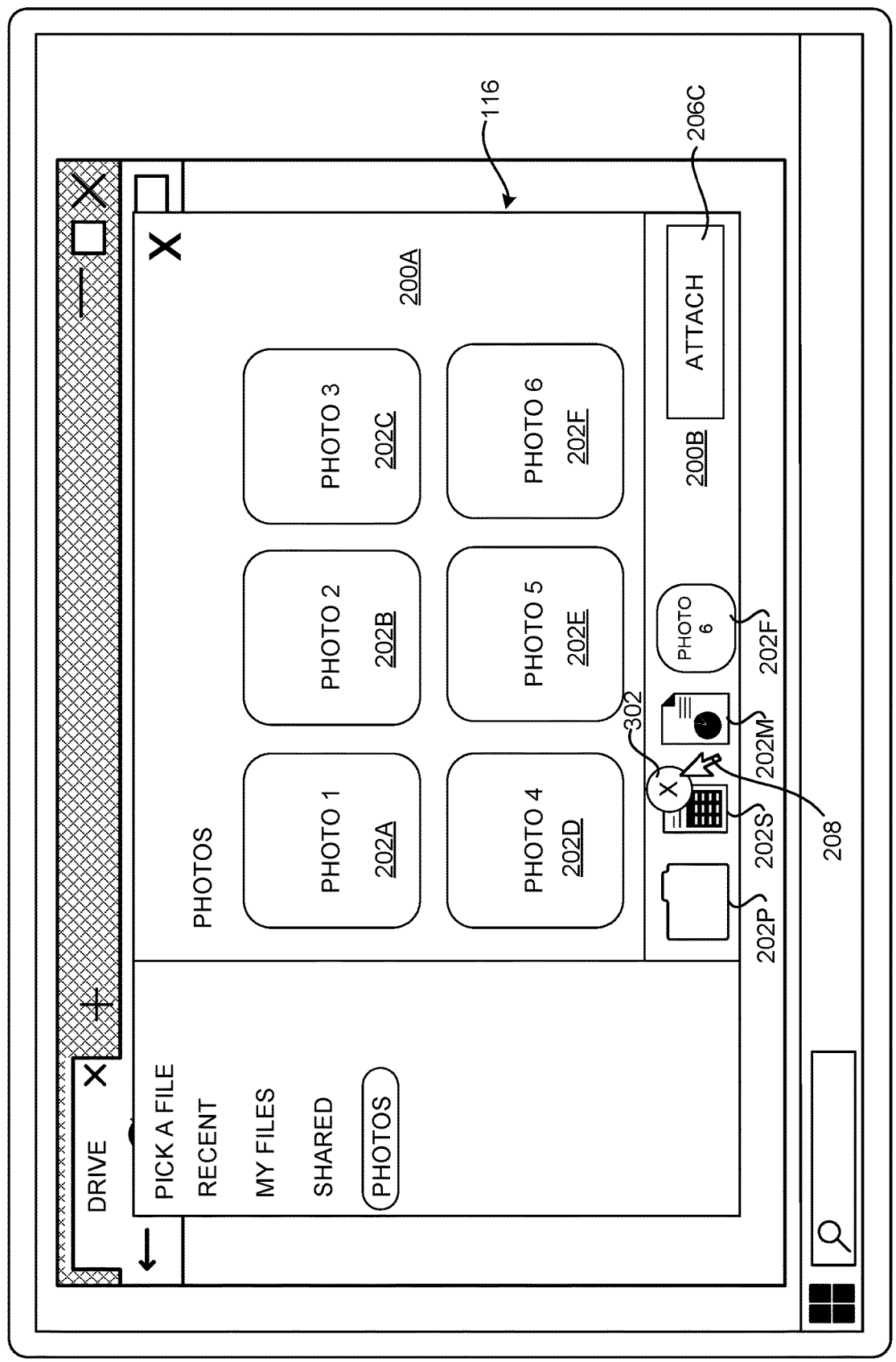
FIG. 4C is a UI diagram illustrating aspects of a file selection UI for removing files from a holding area of the file selection UI, according to one embodiment disclosed herein.

FIG. 4A-4C are UI diagrams illustrating aspects of the functionality provided by the file selection UI 116 for enabling the selection of files 106 of different types in different locations 108 maintained by the file hosting service 102 for performing a messaging operation, according to one embodiment disclosed herein. In the example shown in FIGS. 4A-4C, a user of the computing device 112 has utilized the navigation area 200A of the file selection UI 116 to navigate to a location 108 provided by the file hosting service 102 called "My Files." In response thereto, visual representations 2020-202Q corresponding to folders in the selected location and visual representations 202R-202U corresponding to files 106 in the selected location are presented in the navigation area 200A.

As shown in FIG. 4A, the user in the illustrated example has also utilized a cursor 208 and an appropriate user input device, such as a mouse or touchpad, to drag and drop visual representations 202P-202M from the navigation area 200A to the holding area 200B. In this example, the files are of different types. In particular, the visual representation 202S corresponds to a spreadsheet file, the visual representation 202M corresponds to a presentation file, and the visual representation 202U corresponds to a document.

Subsequently, and as illustrated in FIG. 4B, the user has provided user input to the navigation area 200A to navigate to a second location 108 provided by the file hosting service 102 called "Photos." Thereafter, the user has utilized the cursor 208 and an appropriate user input device to drag the visual representation 202F to the holding area 200B. Accordingly, visual representations 202P, 202S, 202M, and 202F are shown in the holding area 200B and references 110 to the corresponding files have been stored.

As discussed above, the file selection UI 116 can also provide functionality for removing visual representations 202 of files 106 from the holding area 200B so that operations will not be performed on those files 106. For instance, continuing the example from FIGS. 4A and 4B, a user might utilize the cursor 208 and an appropriate user input device to hover over one of the visual representations 202, in this case the visual representation 202S. The user might utilize other types of user input to select a visual representation 202. In response thereto, a UI control 302 has been displayed adjacent to the visual representation 202S. The user can select the UI control 302 utilizing the cursor 302 in order to request that the visual representation 202S be deleted from the holding area 200B. In response thereto, the visual representation 202S is deleted from the holding area 200B and the reference 110 to the corresponding file is deleted.

The process described above with regard to FIGS. 4A-4C may be repeated for multiple storage locations 108 until the user has added visual representations 202 to the holding area 200B for all of the files 106 they desire to perform an operation, or operations, on. Once the user has added the visual representations 202 corresponding to the desired files 106 to the holding area 200B, the user may provide user input requesting that the file hosting service 102 perform one or more operations on the files 106 represented by the previously stored references 110. For instance, the user might select the UI control 206C to initiate a messaging operation on the file hosting service 102 by which the files represented in the holding area 200B are attached to a message, such as an electronic mail message or an instant message, and transmitted to one or more other users.

Figure 5:
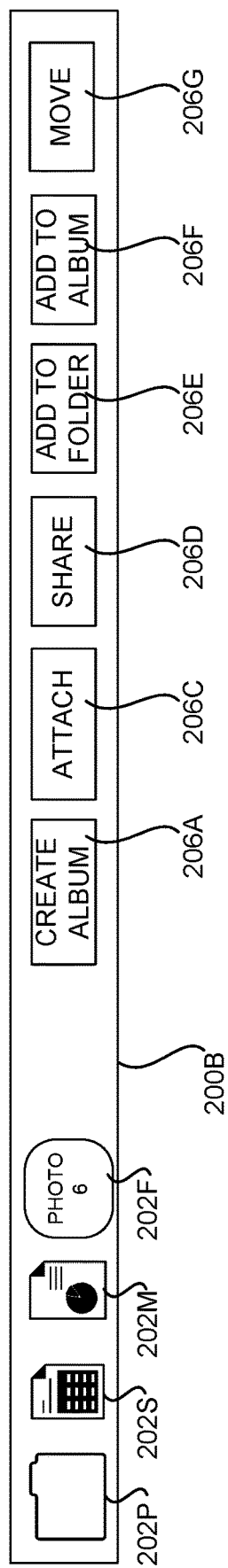
FIG. 5 is a UI diagram illustrating aspects of one mechanism disclosed herein for specifying operations to be performed on files represented in the holding area of the disclosed file selection UI, according to one embodiment disclosed herein.

FIG. 5 is a UI diagram illustrating aspects of one mechanism disclosed herein for specifying operations to be performed on files 106 represented in the holding area 200B of the file selection UI 116, according to one embodiment disclosed herein. As shown in FIG. 5, the holding area 200B can include user interface controls for initiating various types of operations on the files represented in the holding area 200B.

For instance, the UI control 206A might be selected in order to create an album (e.g., a photo album) containing the represented files, the UI control 206C might be selected in order to attach the represented files to an electronic message, the UI control 206D might be selected in order to share the represented files with other users (e.g., by providing a hyperlink where the shared files can be accessed), the UI control 206E might be selected in order to add the represented files to a folder on the file hosting service 102, the UI control 206F might be selected in order to add the represented files to an existing album (e.g., a photo album), and the UI control 206G might be selected in order to move the represented files from one location 108 to another location 108. Other UI controls for performing other operations can be provided in some embodiments.

Additionally, the UI controls displayed in the holding area 200B for initiating operations might be selected and displayed based on the file types of the files 106 represented in the holding area 200B. For instance, if no photos have been added to the holding area, the UI controls 206A and 206F for creating an album and adding to an album, respectively, would not be shown.

In some embodiments, different operations can be performed on subsets of files represented in the holding area 200B. For example, in these embodiments UI controls might be provided for selecting the visual representations 202 of files in the holding area 200B. Once one or more visual representations 202 have been selected, a user might initiate an operation on the represented files. The visual representations 202 corresponding to the files upon which the operation was performed may then be removed from the holding area 200B.

The user might then select another subset of the visual representations 202 in the holding area 200B and request that a different operation be performed on the represented files. The requested operation will be performed and the visual representations 202 corresponding to the operated-upon files 106 will be removed from the holding area 200B. This process can be repeated until all of the visual representations 202 have been removed from the holding area 200B.

It is to be appreciated that the embodiment illustrated in FIG. 5 is merely illustrative and is intended to illustrate some of the possible actions that might be performed on selected files. For example, the UI controls 206A and 206F might be combined into a single UI control that, when selected, provides functionality for enabling a user to create a new album during a workflow for adding a media file (e.g., a photo or video) to an album. As another example, UI controls for initiating actions with respect to media files such as creating an album or adding to an album, may not be presented when documents and media files are selected simultaneously. In another example, the UI control 206C is presented only when one or more files have been selected and is not shown with the other UI controls illustrated in FIG. 5. Other configurations can be utilized in other embodiments.

FIGS. 6A-6F are UI diagrams illustrating aspects of one mechanism disclosed herein for providing the file selection UI 116 on a smartphone device or another type of touch-enabled computing device, according to one embodiment disclosed herein. In particular, FIGS. 6A-6F show a touch-enabled smartphone computing device 112. In this embodiment, the display screen of the computing device 112 is touch sensitive, thereby enabling the device to recognize touch or stylus input, taps, swipes, and other types of gestures, some of which are described below.

Touch-sensitive displays screens can be resistive touchscreens, capacitive touchscreens, surface acoustic wave touchscreens, infrared touchscreens, optical imaging touchscreens, dispersive signal touchscreens, acoustic pulse recognition touchscreens, or can utilize any other touchscreen technology. In some configurations, the touchscreen is incorporated on top of a display as a transparent layer to enable a user to use one or more touches to interact with objects or other information presented on the display.

As mentioned above, a touch-sensitive display screen can be configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims.

In some configurations, the computing device 112 supports a tap gesture in which a user taps a display once. A double tap gesture in which a user taps a display twice can also be supported. The double tap gesture can be used to perform various operations including, but not limited to, zooming in or zooming out in stages. Tap gestures can also be performed utilizing multiple fingers.

In some configurations, the computing device 112 supports a tap and hold gesture in which a user taps and maintains contact with the display for at least a pre-defined period of time. The tap and hold gesture can be used for various reasons including, but not limited to, making a selection of a portion of a UI element such as those found in the file selection UI 116. Tap and hold gestures can also be performed using multiple fingers.

In some configurations, the computing device 112 supports a drag gesture in which a user places a finger on a display and maintains contact with display while moving their finger. The drag gesture can be used for various reasons including, but not limited to, moving through screens, images, or menus at a controlled rate. Multiple finger drag gestures are also contemplated. As described in greater detail below, drag gestures can be utilized to add visual representations 202 to the holding area 200B.

In some configurations, the computing device 112 supports a flick gesture in which a user swipes a finger in the direction the user wants the screen to move. The flick gesture can be used for various reasons including, but not limited to, scrolling horizontally or vertically through menus or pages. Such a gesture can be used, for example, to scroll the contents of the navigation area 200A.

In some configurations, the computing device 112 supports a pinch and stretch gesture in which a user makes a pinching motion with two fingers (e.g., thumb and forefinger) or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other objects such as digital pens can be used to interact with touch-sensitive display of the computing device 112. As such, the above gestures should be understood as being illustrative and should not be construed as being limiting in any way.

Additionally, and as will be described in greater detail below with regard to FIG. 8, the technologies disclosed herein can also be utilized with augmented reality ("AR") or virtual reality ("VR") devices utilizing a "virtual touch." Accordingly, the term "touch" as utilized herein encompasses both a physical touch of a touch-enabled computing device 112 and a virtual touch of a UI element presented by an AR or VR computing device 112.

Figure 6A:
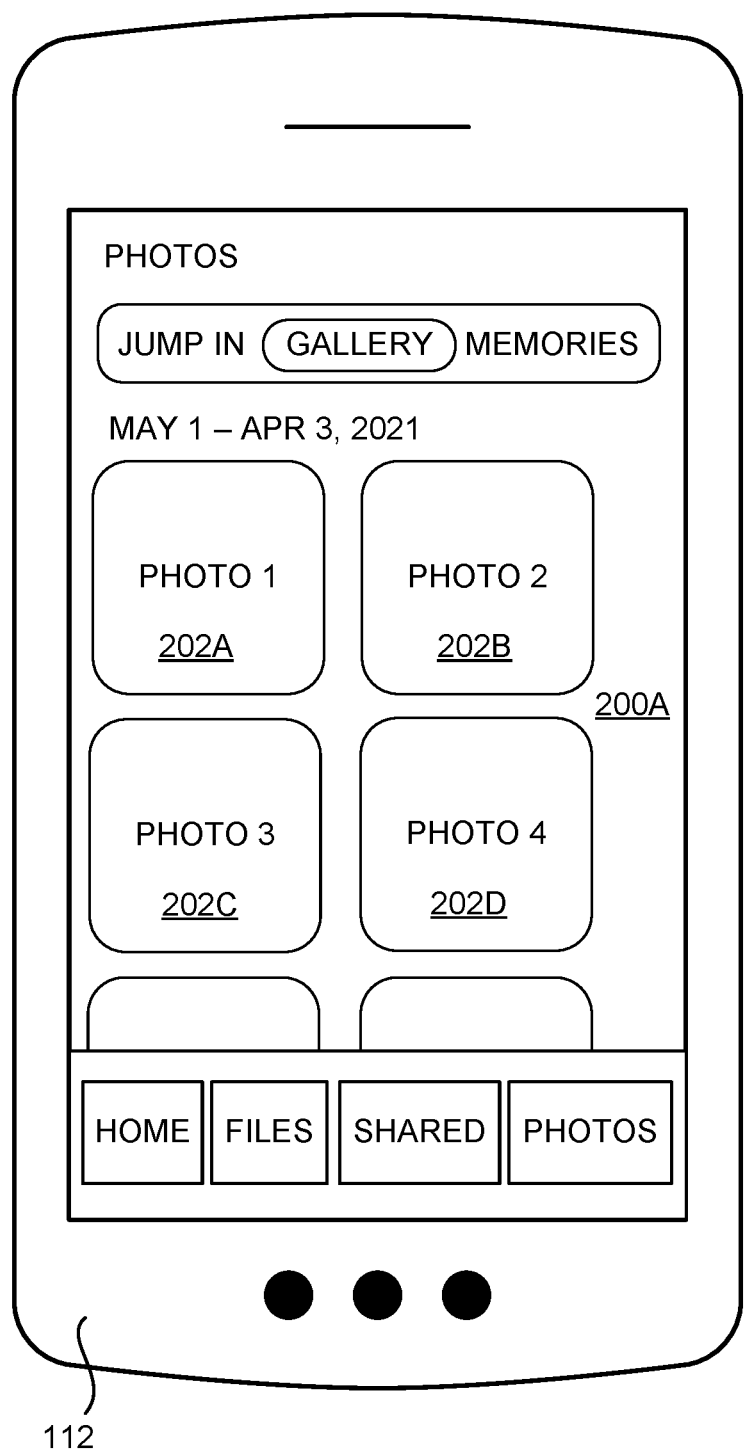
FIG. 6A is a UI diagram illustrating aspects of one mechanism disclosed herein for providing a file selection UI on a smartphone device, according to one embodiment disclosed herein.

In the example shown in FIGS. 6A-4E, a user of the touch-enabled computing device 112 has utilized the navigation area 200A of the file selection UI 116 to navigate to a location 108 provided by the file hosting service 102 called "Gallery." In response thereto, visual representations 202A-202D corresponding to files 106 in the selected location are presented in the navigation area 200A.

Figure 6B:
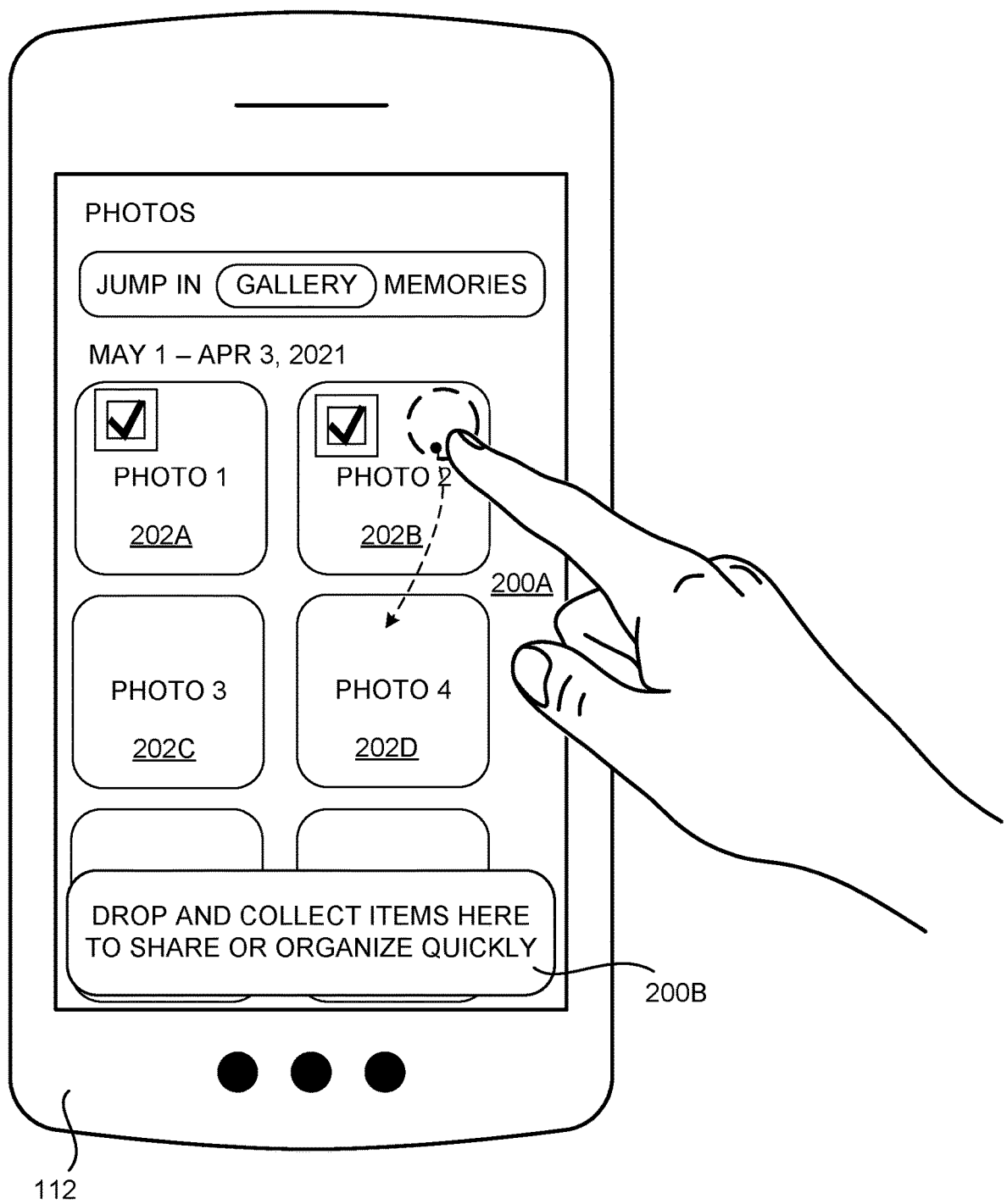
FIG. 6B is a UI diagram illustrating aspects of one mechanism disclosed herein for providing a file selection UI on a smartphone device, according to one embodiment disclosed herein.
Figure 6C:
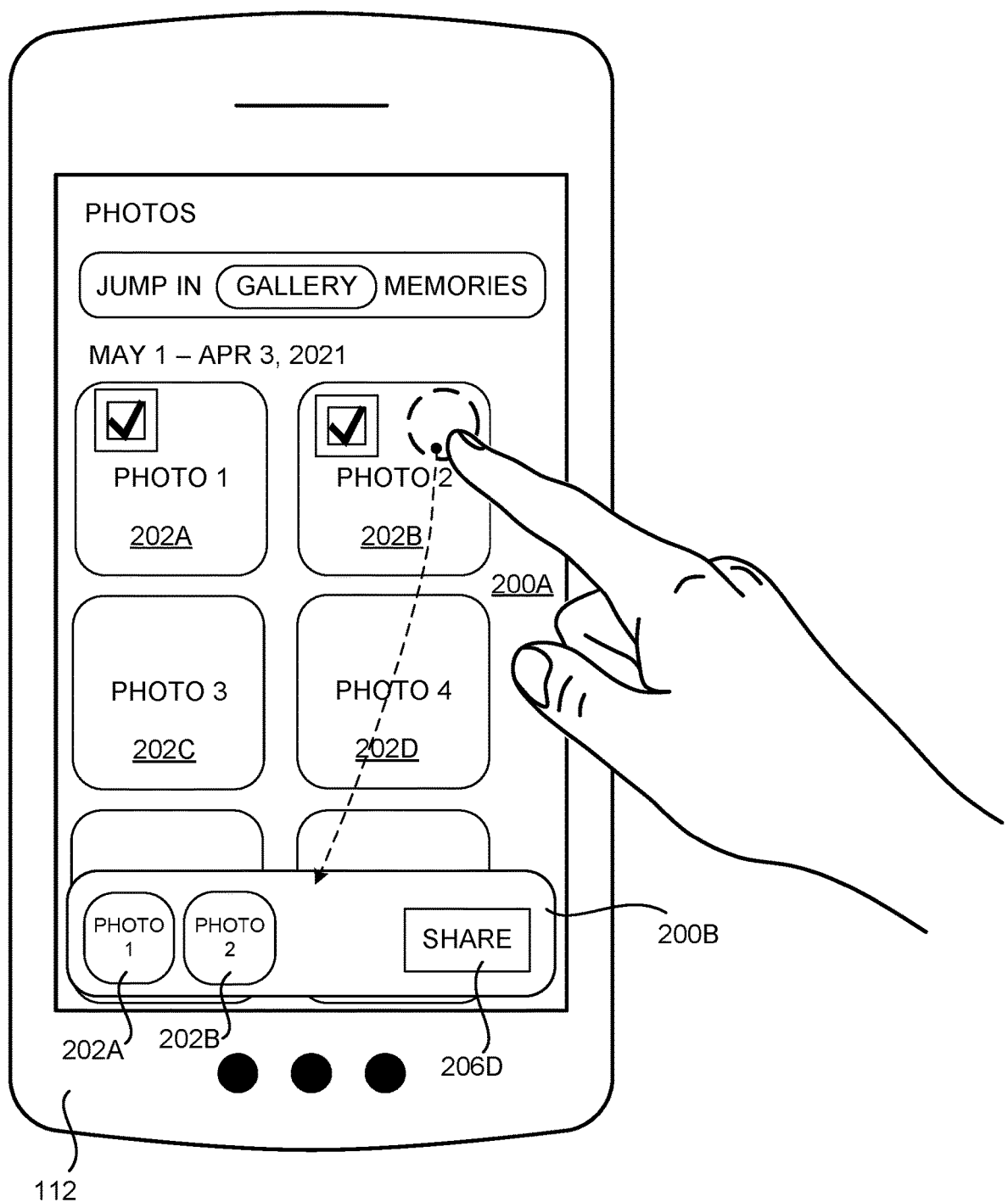
FIG. 6C is a UI diagram illustrating aspects of one mechanism disclosed herein for providing a file selection UI on a smartphone device, according to one embodiment disclosed herein.

As shown in FIG. 6B, the user in the illustrated example has also utilized their finger to select visual representations 202A and 202D in the navigation area 200A. In the illustrated embodiment, the holding area 200B of the file selection UI 116 is hidden until a user selects or drags visual representations 202 of files 106 displayed in the navigation area 200A. Accordingly, when the user begins a drag gesture, the holding area 200B is presented by the computing device 112. As illustrated in FIG. 6C, the user can complete the drag gesture to add the visual representations 202A and 202B to the holding area 200B.

Figure 6D:
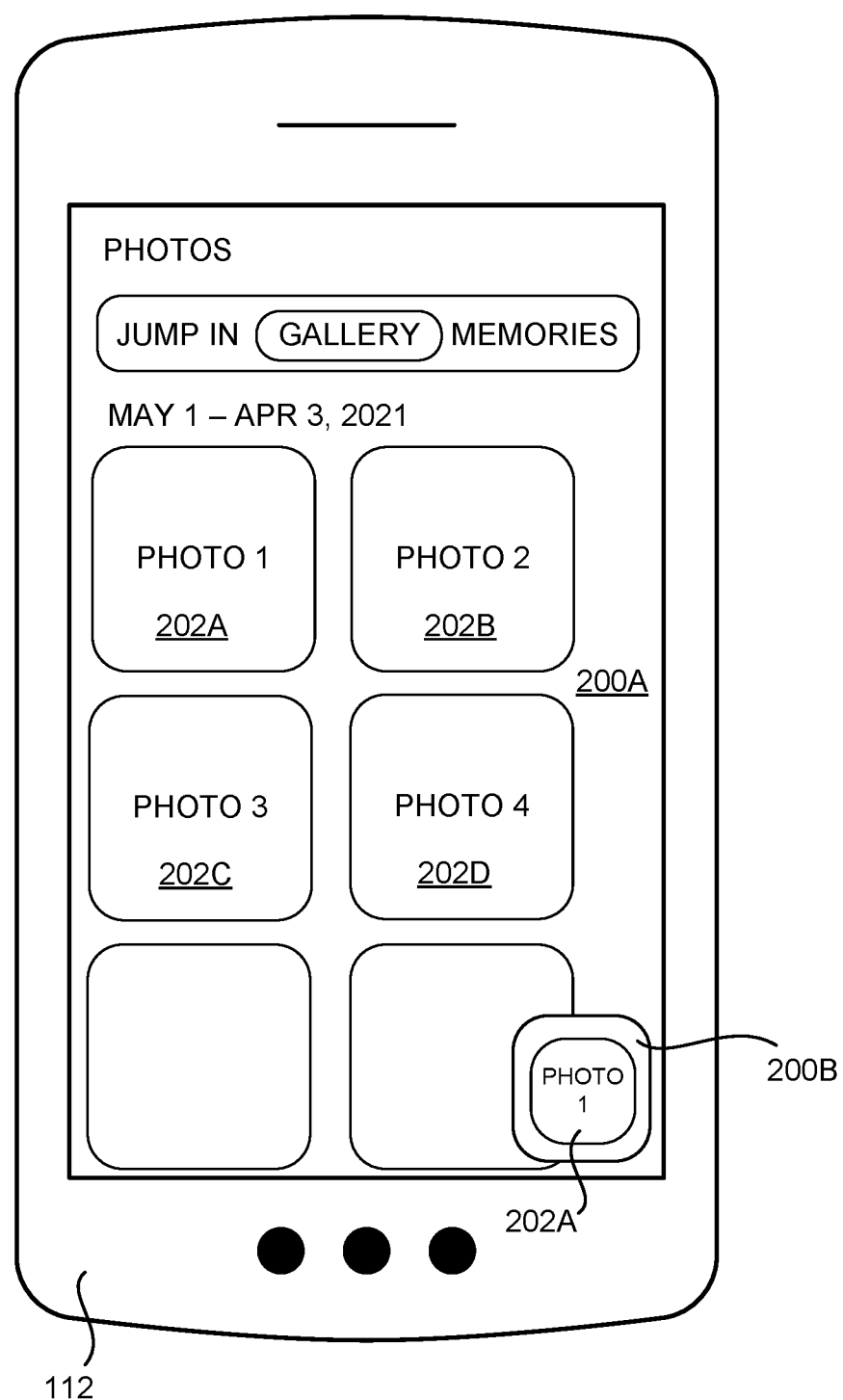
FIG. 6D is a UI diagram illustrating aspects of one mechanism disclosed herein for providing a file selection UI on a smartphone device, according to one embodiment disclosed herein.

As shown in FIG. 6D, in some embodiments the holding area 200B is minimized to a single visual representation 202A when a user is no longer selecting or dragging visual representations 202 shown in the navigation area 200A and has not interacted with the holding area 200B. In this manner, the holding area 200B can remain visible while blocking only a small portion of the navigation area 200A. The holding area 200B can again be displayed at its full size (e.g., as shown in FIG. 6E) when the user selects or drags visual representations 202 shown in the navigation area 200A.

Figure 6E:
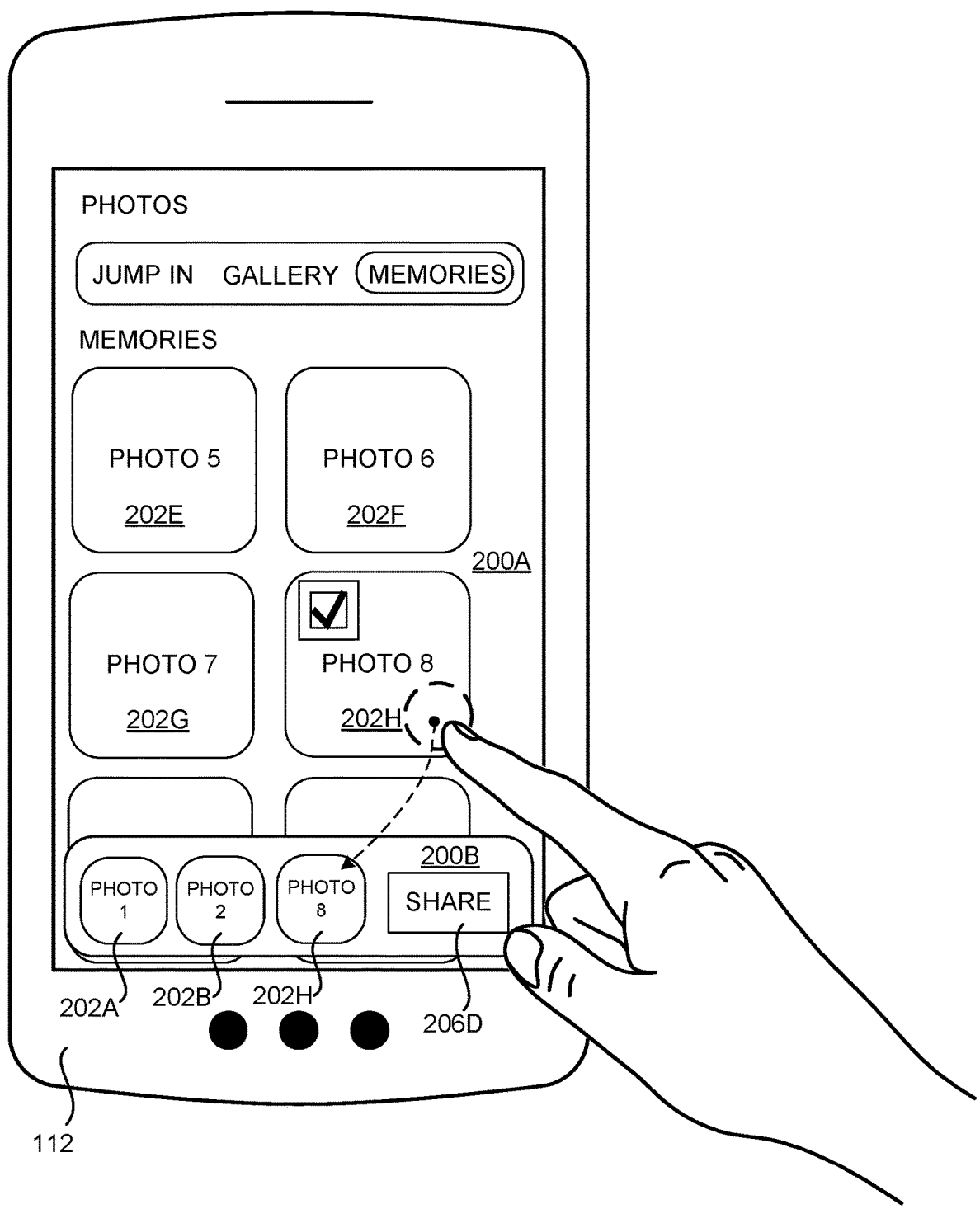
FIG. 6E is a UI diagram illustrating aspects of one mechanism disclosed herein for providing a file selection UI on a smartphone device, according to one embodiment disclosed herein.

Subsequently, and as illustrated in FIG. 6E, the user has provided user input to the navigation area 200A to navigate to a second location 108 provided by the file hosting service 102 called "Memories." Thereafter, the user has utilized a drag gesture to drag the visual representation 202H to the holding area 200B. Accordingly, visual representations 202A, 202B, and 202H are shown in the holding area 200B and references 110 to the corresponding files have been stored by the computing device 112.

Figure 6F:
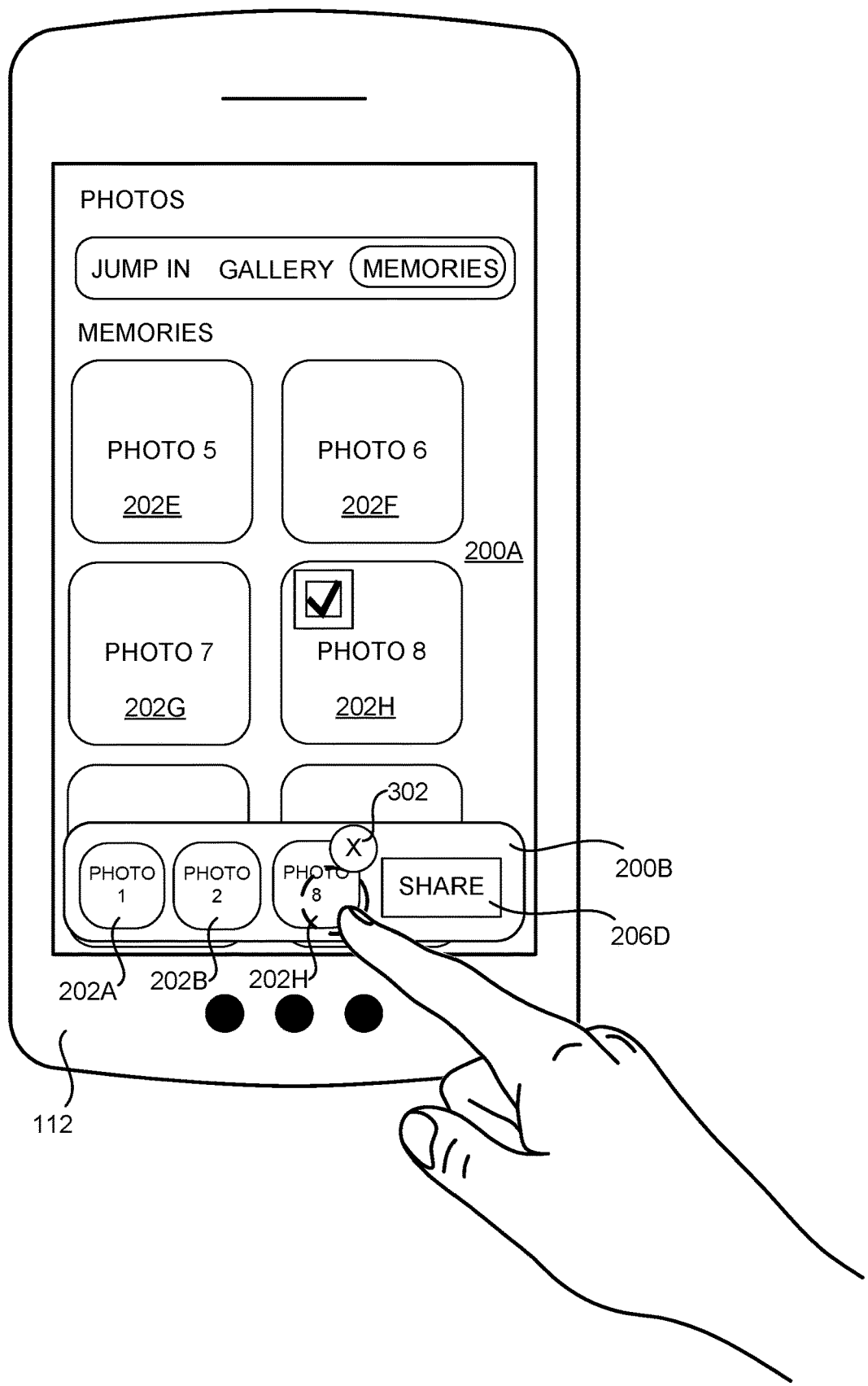
FIG. 6F is a UI diagram illustrating aspects of one mechanism disclosed herein for providing a file selection UI on a smartphone device, according to one embodiment disclosed herein.

As discussed above, the file selection UI 116 can also provide functionality for removing visual representations 202 of files 106 from the holding area 200B so that operations will not be performed on those files 106. For instance, continuing the example from FIGS. 6A-6E, and as shown in FIG. 6F, a user might utilize a tap and hold gesture to select one of the visual representations 202, in this case the visual representation 202H. In response thereto, a UI control 302 has been displayed adjacent to the visual representation 202H. The user can select the UI control 302 utilizing a tap gesture order to request that the visual representation 202H be deleted from the holding area 200B. In response thereto, the visual representation 202H is deleted from the holding area 200B and the reference 110 to the corresponding file is deleted.

The process described above with regard to FIGS. 6A-6F may be repeated for multiple storage locations 108 until the user has added visual representations 202 to the holding area 200B for all of the files 106 they desire to perform an operation, or operations, on. Once the user has added the visual representations 202 corresponding to the desired files 106 to the holding area 200B, the user may provide user input requesting that the file hosting service 102 perform one or more operations on the files 106 represented by the previously stored references 110. For instance, the user might select the UI control 206D to initiate a sharing operation by which the files 106 represented by the visual representations 202A and 202B in the holding area 200B are shared with one or more other users.

Figure 7:
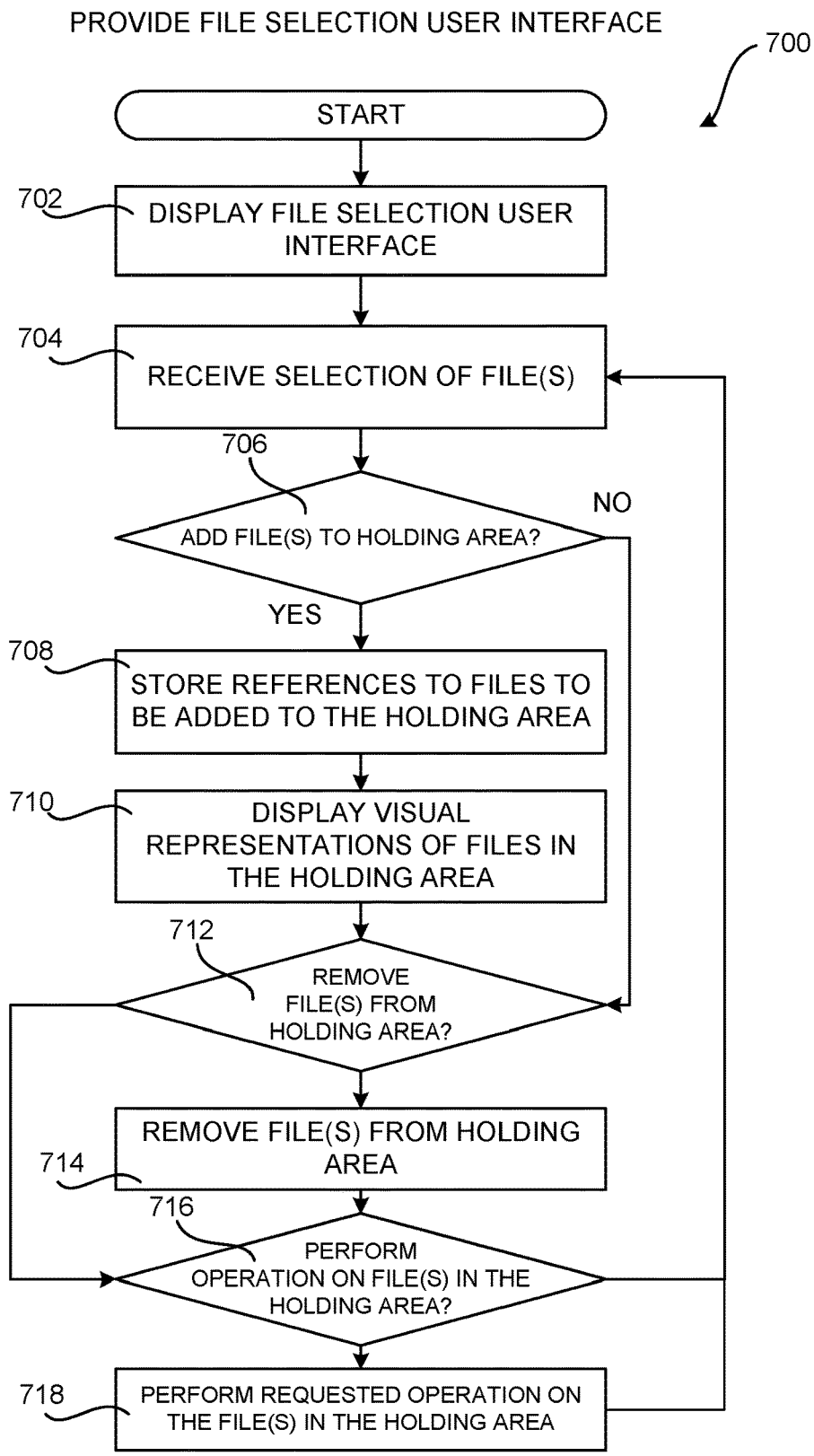
FIG. 7 is a flow diagram illustrating aspects of one illustrative routine disclosed herein for providing the file selection UI described with reference to FIGS. 1-6F, according to one embodiment disclosed herein.

FIG. 7 is a flow diagram illustrating aspects of one illustrative routine 700 disclosed herein for providing the file selection UI 116 described with reference to FIGS. 1-6F, according to one embodiment disclosed herein. The routine 700 begins at operation 702, where the computing device 112 displays the file selection user interface 116. The routine 700 then proceeds from operation 702 to operation 704, where the computing device 112 may receive a selection of visual representations 202 corresponding to files 106 stored by the file hosting service 102 in the navigation area 200A.

From operation 704, the routine 700 proceeds to operation 706, where the computing device 112 may make a determination as to whether user input has been received for adding the visual representations 202 of the files 106 to the holding area 200B. For instance, a drag and drop operation or a drag gesture might be performed in the manner described above.

If a request is made to add files 106 to the holding area 200B, the routine 700 proceeds from operation 706 to operation 708, where references 110 to the selected files 106 are stored. The routine 700 then proceeds from operation 708 to operation 710, where visual representations 202 are presented in the holding area 200B in the manner described above.

From operation 710, the routine 700 proceeds to operation 712, where the computing device 112 determines whether user input has been received requesting that one or more visual representations 202 be removed from the holding area 200B as in the examples described above. If so, the routine 700 proceeds from operation 712 to operation 714, where the computing device 112 removes the selected visual representations 202 from the holding area 200B.

From operation 714, the routine 700 proceeds to operation 716, where the computing device 112 determines whether user input has been received requesting that one or more operations be performed by the file hosting service 102 on the files 106 corresponding to the visual representations 202 in the holding area 200B. If not, the routine 700 proceeds back to operation 704, where additional visual representations 202 of files 106 can be added to or removed from the holding area 200B.

If user input has been received requesting that one or more operations be performed by the file hosting service 102 on the files 106 corresponding to the visual representations 202 in the holding area 200B, the routine 700 proceeds from operation 716 to operation 718. At operation 718, the requested operation, or operations, are performed on the files 106 represented by the visual representations 202 in the holding area 200B. The routine 700 then proceeds back to operation 702, where the process described above may be repeated.

Figure 8:
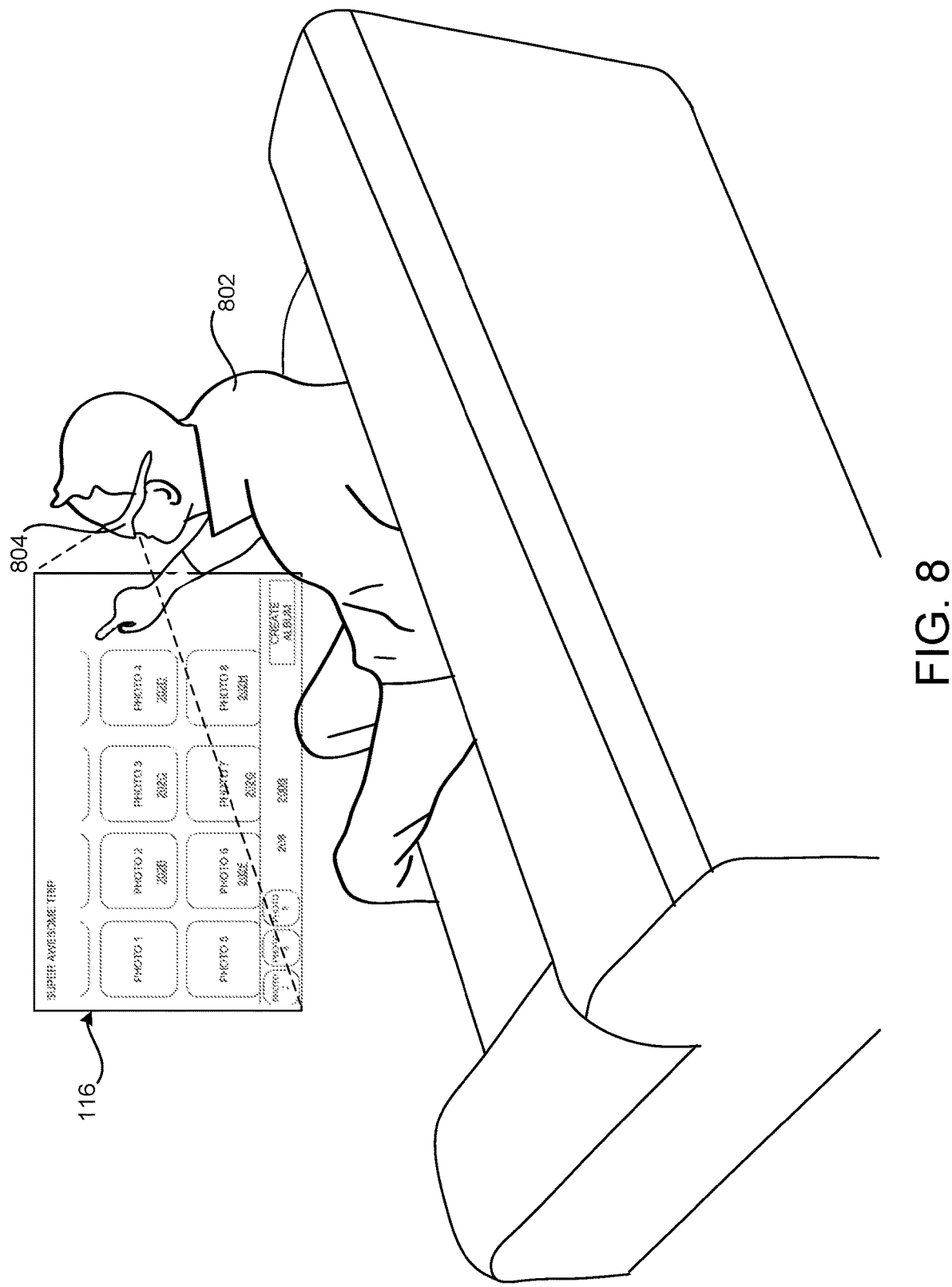
FIG. 8 is a pictorial diagram illustrating aspects of the utilization of the various technologies disclosed herein with an augmented or virtual reality device.

FIG. 8 is a pictorial diagram illustrating aspects of the utilization of the various technologies disclosed herein with AR, VR, and mixed reality ("MR") devices. In particular, FIG. 8 illustrates a user 802 utilizing a head-mounted VR device 804 to interact with a virtual file selection UI 116. In order to provide this functionality, the VR device 804 includes one or more display panels (not shown in FIG. 8) that display computer-generated ("CG") graphics, including UI elements such as those described above.

For example, the VR device 804 might include a right-eye display panel for right-eye viewing and a left-eye display panel for left-eye viewing. A right-eye display panel is typically located near a right eye of the user to fully or partially cover a field of view of the right eye, and a left-eye display panel is located near a left eye of the user to fully or partially cover a field of view of the left eye.

In another example, a unitary display panel might extend over both the right and left eyes of a user and provide both right-eye and left-eye viewing via right-eye and left-eye viewing regions of the unitary display panel. In each of these implementations, the ability of the VR device 804 to separately display different right-eye and left-eye graphical content via right-eye and left-eye displays might be used to provide a user 802 of the VR device 804 with a stereoscopic viewing experience.

The VR device 804 might include a variety of on-board sensors. For example, and without limitation, a sensor subsystem (not shown in FIG. 8) might include one or more outward facing optical cameras (e.g., cameras located on an external surface of the VR device 804 and forward facing in a viewing direction of the user 802), such as an optical camera. The VR device 804 can also include one or more inward facing optical cameras (also not shown in FIG. 8) (e.g., rearward facing toward the user 802 and/or toward one or both eyes of the user 802).

The VR device 804 can also include a variety of other sensors (not shown in FIG. 8) including, but not limited to, accelerometers, gyroscopes, magnetometers, environment understanding cameras, depth cameras, inward or outward facing video cameras, microphones, ambient light sensors, and potentially other types of sensors. Data obtained by the sensors can be utilized to detect the location, orientation (which might be referred to as a "pose"), and movement of the VR device 804.

The one or more outward facing optical cameras of the VR device 804 can be configured to observe the real-world environment and output images illustrating the real-world environment observed by a user 802 of the VR device 804. The optical cameras are red-green-blue ("RGB") cameras and infrared cameras in one embodiment. It is to be appreciated, however, that other types of cameras can be utilized in other configurations such as, but not limited to, black and white ("B&W") cameras. Additionally, the same or different cameras can be utilized for tracking motion of the head of the user 802 (i.e., "head tracking").

The VR device 804 might also include a processing subsystem (not shown in FIG. 8) that includes one or more processor devices that perform at least some of the processes and operations described herein, as defined by instructions executed by the processing subsystem. Such processes or operations might include generating and providing image signals to the display panels, receiving sensory signals from sensors such as cameras, and enacting control strategies and procedures responsive to those sensory signals. Other computing systems, such as local or remote computing devices might also perform some of the computational tasks disclosed herein.

The VR device 804 might also include an on-board data storage subsystem (not shown in FIG. 8) that includes one or more memory devices storing computer-executable instructions (e.g., software and/or firmware) executable by the processing subsystem and might additionally hold other suitable types of data. The VR device 804 might also include a communications subsystem supporting wired and/or wireless communications with remote devices (i.e., off-board devices) over a communications network (not shown in FIG. 8). As an example, the communication subsystem of the VR device 804 might be configured to wirelessly send or receive data, images, digital audio, and/or other information to and from the remote computing devices.

In order to provide the functionality discussed above with regard to FIGS. 1-7 the VR device 804 can present UI elements, such as the file selection UI 116 to a user 802. Additionally, the VR device 804 can utilize the sensors described above to detect the position and movement of the fingers and hands of the user 802. Through the use of data describing the position of movement of the fingers of the user 802, the VR device 804 can detect gestures made by the user 802 in three-dimensional space with respect to virtual UI elements presented by the VR device 804, such as the file selection UI 116.

Accordingly, in view of this functionality, and as mentioned above, the term "touch" as utilized herein encompasses both the physical touch of a device, such as a device with a physical touchscreen, and the virtual touch of a UI element presented by a VR device 804 or an AR device. In this regard, it is also to be appreciated that the technologies disclosed herein can be utilized with AR devices, which can augment a user's view of the real-world environment with virtual UI elements, such as the UI window 102G. The virtual UI elements appear as if they are actually present in the real-world environment when the real-world environment is viewed with such an AR device. Tracking of a user's hand can be performed in a manner similar to that described above and gestures and associated functionality such as that described above with regard to FIGS. 1-7 can be implemented.

Figure 9:
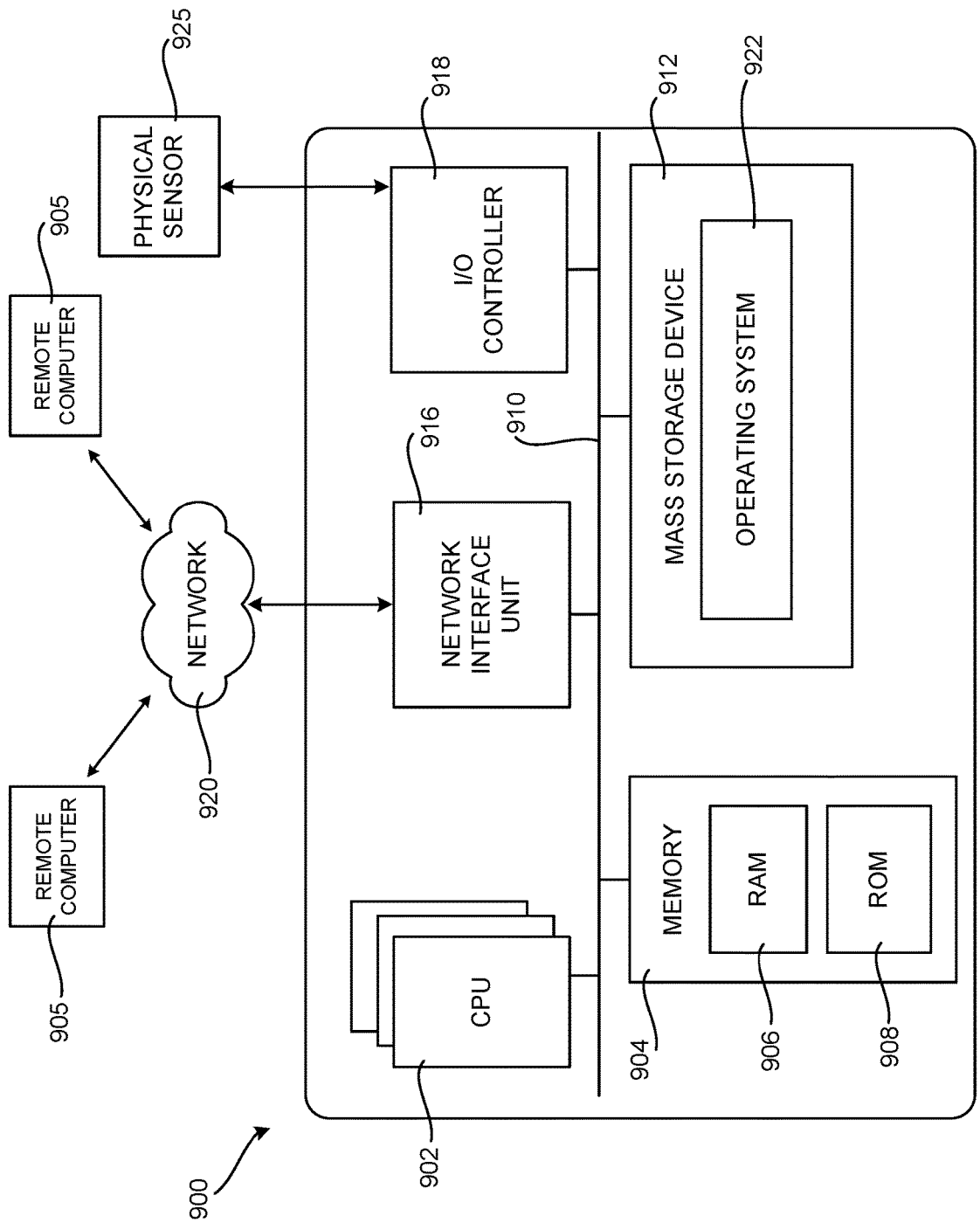
FIG. 9 is a computer architecture diagram showing an illustrative computer hardware and software architecture for a computing device that can implement aspects of the technologies presented herein.

FIG. 9 is a computer architecture diagram showing an illustrative computer hardware and software architecture for a computing device 112 that can implement the various technologies presented herein. In particular, the architecture illustrated in FIG. 9 can be utilized to implement a computing device such as a mobile phone, an e-reader, a smartphone, a desktop computer, a tablet computer, a laptop computer, or another type of computing device.

The computer 900 illustrated in FIG. 9 includes a central processing unit 902 ("CPU"), a system memory 904, including a random-access memory 906 ("RAM") and a read-only memory ("ROM") 908, and a system bus 910 that couples the memory 904 to the CPU 902. A basic input/output system ("BIOS" or "firmware") containing the basic routines that help to transfer information between elements within the computer 900, such as during startup, can be stored in the ROM 908.

The computer 900 further includes a mass storage device 912 for storing an operating system 922, application programs, and other types of programs. In one embodiment, an application program executing on the computer 900 provides the functionality described above with regard to FIGS. 1-7. Other modules or program components can provide this functionality in other embodiments. The mass storage device 912 can also be configured to store other types of programs and data.

The mass storage device 912 is connected to the CPU 902 through a mass storage controller (not shown) connected to the bus 910. The mass storage device 912 and its associated computer readable media provide non-volatile storage for the computer 900. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 900.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 900. For purposes of the claims, the phrase "computer storage medium," and variations thereof, does not include waves or signals per se or communication media.

According to various configurations, the computer 900 can operate in a networked environment using logical connections to remote computers through a network such as the network 920. The computer 900 can connect to the network 920 through a network interface unit 916 connected to the bus 910. It should be appreciated that the network interface unit 916 can also be utilized to connect to other types of networks and remote computer systems.

The computer 900 can also include an input/output controller 918 for receiving and processing input from a number of other devices, including a keyboard, mouse, touch input, an electronic stylus (not shown in FIG. 9), or a physical sensor such as a video camera. Similarly, the input/output controller 918 can provide output to a display screen or other type of output device (also not shown in FIG. 9).

It should be appreciated that the software components described herein, when loaded into the CPU 902 and executed, can transform the CPU 902 and the overall computer 900 from a general-purpose computing device into a special-purpose computing device customized to facilitate the functionality presented herein. The CPU 902 can be constructed from any number of transistors or other discrete circuit elements, which can individually or collectively assume any number of states.

More specifically, the CPU 902 can operate as a finite-state machine, in response to executable instructions contained within the software modules disclosed herein. These computer-executable instructions can transform the CPU 902 by specifying how the CPU 902 transitions between states, thereby transforming the transistors or other discrete hardware elements constituting the CPU 902.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 900 in order to store and execute the software components presented herein. It also should be appreciated that the architecture shown in FIG. 9 for the computer 900, or a similar architecture, can be utilized to implement other types of computing devices, including hand-held computers, video game devices, embedded computer systems, mobile devices such as smartphones, tablets, and AR and VR devices such as that described above with regard to FIG. 8, and other types of computing devices known to those skilled in the art. It is also contemplated that the computer 900 might not include all of the components shown in FIG. 9, can include other components that are not explicitly shown in FIG. 9, or can utilize an architecture completely different than that shown in FIG. 9.

Figure 10:
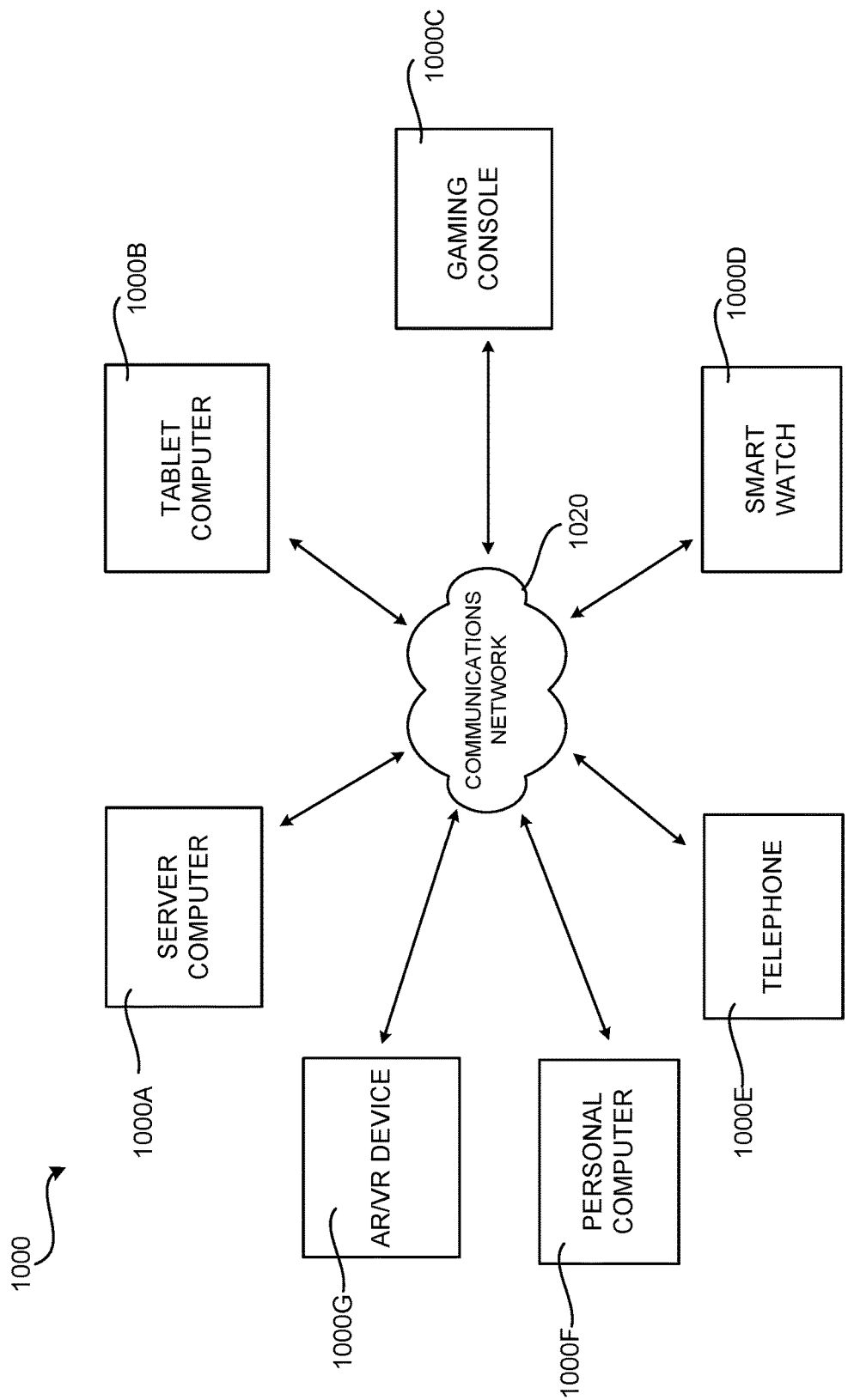
FIG. 10 is a network diagram illustrating a distributed computing environment in which aspects of the disclosed technologies can be implemented.

FIG. 10 is a network diagram illustrating a distributed network computing environment 1000 in which aspects of the disclosed technologies can be implemented, according to various embodiments presented herein. As shown in FIG. 10, one or more server computers 1000A can be interconnected via a communications network 1020 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 1000B, a gaming console 1000C, a smart watch 1000D, a telephone 1000E, such as a smartphone, a personal computer 1000F, and an AR/VR device 1000G.

In a network environment in which the communications network 1020 is the Internet, for example, the server computer 1000A can be a dedicated server computer operable to process and communicate data to and from the client computing devices 1000B-1000G via any of a number of known protocols, such as, hypertext transfer protocol ("HTTP"), file transfer protocol ("FTP"), or simple object access protocol ("SOAP"). Additionally, the networked computing environment 1000 can utilize various data security protocols such as secured socket layer ("SSL") or pretty good privacy ("PGP"). Each of the client computing devices 1000B-1000G can be equipped with an operating system operable to support one or more computing applications or terminal sessions such as a web browser (not shown in FIG. 10), or other graphical UI, including those illustrated above, or a mobile desktop environment (not shown in FIG. 10) to gain access to the server computer 1000A.

The server computer 1000A can be communicatively coupled to other computing environments (not shown in FIG. 10) and receive data regarding a participating user's interactions/resource network. In an illustrative operation, a user (not shown in FIG. 10) may interact with a computing application running on a client computing device 1000B-1000G to obtain desired data and/or perform other computing applications.

The data and/or computing applications may be stored on the server 1000A, or servers 1000A, and communicated to cooperating users through the client computing devices 1000B-1000G over an exemplary communications network 1020. A participating user (not shown in FIG. 10) may request access to specific data and applications housed in whole or in part on the server computer 1000A. These data may be communicated between the client computing devices 1000B-1000G and the server computer 1000A for processing and storage.

The server computer 1000A can host computing applications, processes and applets for the generation, authentication, encryption, and communication of data and applications, and may cooperate with other server computing environments (not shown in FIG. 10), third party service providers (not shown in FIG. 10), network attached storage ("NAS") and storage area networks ("SAN") to realize application/data transactions.

In some embodiments, the server computer 1000A provides implements the file hosting service 102 described above. In these embodiments, the file selection UI 116 may be presented on the client computing devices 1000B-1000G. For example, the telephone 1000E may provide the user interfaces shown in FIGS. 6A-6F and described above. A personal computer 1000F, such as a desktop or laptop computer, may provide the user interfaces shown in FIGS. 2-5 and described above. Other of the client computing devices 1000 can provide similar functionality in a manner similar to that described above.

It should be appreciated that the computing architecture shown in FIG. 10 and the distributed network computing environment shown in FIG. 10 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following clauses:

Clause 1. A computer-implemented method, comprising: presenting, by way of a computing device, a user interface comprising a first portion and a second portion; causing visual representations corresponding to one or more first files associated with a first location maintained by a file hosting service to be displayed in the first portion of the user interface; receiving first user input selecting one or more of the visual representations corresponding to one or more of the first files; responsive to second user input received at the computing device, causing the selected visual representations corresponding to the one or more of the first files to be displayed in the second portion of the user interface, and storing references to the one or more of the first files corresponding to the selected visual representations; responsive to third user input received at the computing device, causing visual representations corresponding to one or more second files associated with a second location maintained by the file hosting service to be displayed in the first portion of the user interface; receiving fourth user input selecting one or more of the visual representations corresponding to one or more of the second files; responsive to fifth user input received at the computing device, causing the selected visual representations corresponding to the one or more of the second files to be displayed in the second portion of the user interface, and storing references to the one or more of the second files corresponding to the selected visual representations; and responsive to sixth user input received at the computing device, causing the file hosting service to perform one or more operations on the one or more first files and the one or more second files identified by the stored references.

Clause 2. The computer-implemented method of clause 1, wherein the one or more operations comprise one or more file operations performed by the file hosting service on the one or more first files and the one or more second files identified by the stored references.

Clause 3. The computer-implemented method of any of clauses 1 or 2, wherein the one or more operations comprise one or more operations for sharing the one or more first files and the one or more second files identified by the stored references.

Clause 4. The computer-implemented method of any of clauses 1-3, wherein the one or more operations comprise one or more messaging operations for causing a message to be transmitted with the one or more first files and the one or more second files identified by the stored references.

Clause 5. The computer-implemented method of any of clauses 1-4, wherein the one or more operations comprise one or more organizing operations performed by the file hosting service on the one or more first files and the one or more second files identified by the stored references.

Clause 6. The computer-implemented method of any of clauses 1-5, wherein the second portion of the user interface is hidden until the second user input is received.

Clause 7. The computer-implemented method of any of clauses 1-6, further comprising: receiving seventh user input requesting to remove a selected one of the visual representations from the second area of the user interface; and responsive to the seventh user input, removing the selected one of the visual representations from the second area of the user interface, and deleting the stored reference to the selected one of the visual representations.

Clause 8. A computer-readable storage medium having computer-executable instructions stored thereupon which, when executed by a computing device, cause the computing device to: cause visual representations of one or more first files associated with a first location maintained by a file hosting service to be displayed in a navigation area of a user interface; responsive to receiving first user input at the computing device, cause visual representations corresponding to selected one or more of the first files to be displayed in a holding area of the user interface, and store references to the selected one or more of the first files; responsive to receiving second user input at the computing device, cause visual representations of one or more second files associated with a second location maintained by the file hosting service to be displayed in the navigation area; responsive to receiving third user input received at the computing device, cause visual representations corresponding to the selected one or more of the second files to be displayed in the holding area, and store references to the selected one or more of the second files; and responsive to receiving fourth user input at the computing device, cause the file hosting service to perform one or more operations on the one or more first files and the one or more second files identified by the stored references.

Clause 9. The computer-readable storage medium of clause 8, wherein the one or more operations comprise one or more file operations performed by the file hosting service on the one or more first files and the one or more second files identified by the stored references.

Clause 10. The computer-readable storage medium of any of clauses 8 or 9, wherein the one or more operations comprise one or more operations for sharing the one or more first files and the one or more second files identified by the stored references.

Clause 11. The computer-readable storage medium of any of clauses 8-10, wherein the one or more operations comprise one or more messaging operations for causing a message to be transmitted with the one or more first files and the one or more second files identified by the stored references.

Clause 12. The computer-readable storage medium of any of clauses 8-11, wherein the one or more operations comprise one or more organizing operations performed by the file hosting service on the one or more first files and the one or more second files identified by the stored references.

Clause 13. The computer-readable storage medium of any of clauses 8-12, wherein the second portion of the user interface is hidden until the second user input is received.

Clause 14. The computer-readable storage medium of any of clauses 8-13, having further computer-executable instructions stored thereupon which, when executed by the computing device, cause the computing device to: receive fifth user input requesting to remove a selected one of the visual representations from the second area of the user interface; and responsive to the seventh user input, remove the selected one of the visual representations from the second area of the user interface, and delete the stored reference to the selected one of the visual representations.

Clause 15. A computing device, comprising: at least one processor; and a computer-readable storage medium having computer-executable instructions stored thereupon which, when executed by the at least one processor, cause the computing device to: cause visual representations of one or more first files associated with a first location maintained by a file hosting service to be displayed in a navigation area of a user interface; responsive to receiving first user input at the computing device, cause visual representations corresponding to selected one or more of the first files to be displayed in a holding area of the user interface, and store references to the selected one or more of the first files; responsive to receiving second user input at the computing device, cause visual representations of one or more second files associated with a second location maintained by the file hosting service to be displayed in the navigation area; responsive to receiving third user input received at the computing device, cause visual representations corresponding to the selected one or more of the second files to be displayed in the holding area, and store references to the selected one or more of the second files; and responsive to receiving fourth user input at the computing device, cause the file hosting service to perform one or more operations on the one or more first files and the one or more second files identified by the stored references.

Clause 16. The computing device of clause 15, wherein the one or more operations comprise one or more file operations performed by the file hosting service on the one or more first files and the one or more second files identified by the stored references.

Clause 17. The computing device of any of clauses 15 or 16, wherein the one or more operations comprise one or more operations for sharing the one or more first files and the one or more second files identified by the stored references.

Clause 18. The computing device of any of clauses 15-17, wherein the one or more operations comprise one or more messaging operations for causing a message to be transmitted with the one or more first files and the one or more second files identified by the stored references.

Clause 19. The computing device of any of clauses 15-18, wherein the one or more operations comprise one or more organizing operations performed by the file hosting service on the one or more first files and the one or more second files identified by the stored references.

Clause 20. The computing device of any of clauses 15-19, wherein the second portion of the user interface is hidden until the second user input is received.

Based on the foregoing, it should be appreciated that technologies for providing a file selection UI have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer storage medium having computer-executable instructions stored thereupon which, when executed by a computing device, cause the computing device to:
   cause one or more first visual representations associated with one or more first files stored in a first storage location maintained by a file hosting service to be displayed in a navigation area of a user interface;
   responsive to receiving first user input, at the computing device, that selects a first visual representation of the one or more first visual representations displayed in the navigation area:
      cause the first visual representation selected to be displayed in a holding area of the user interface; and
      store a first reference that identifies a first file associated with the first visual representation selected;
   responsive to receiving second user input, at the computing device and while the holding area is displayed with the first visual representation, that selects a second storage location maintained by the file hosting service, cause one or more second visual representations associated with one or more second files stored in the second storage location maintained by the file hosting service to be displayed in the navigation area, wherein the one or more second visual representations replace the one or more first visual representations in the navigation area;
   responsive to receiving third user input, at the computing device and while the holding area is displayed with the first visual representation, that selects a second visual representation of the one more second visual representations displayed in the navigation area:
      cause the second visual representation selected to be displayed in the holding area; and
      store a second reference that identifies a second file associated with the second visual representation selected; and
   responsive to receiving fourth user input, at the computing device and while the holding area is displayed with the first visual representation and the second visual representation, that selects an operation, cause the file hosting service to perform the operation on both the first file identified by the first reference and the second file identified by the second reference, wherein the operation is one of a sharing operation, a transmission operation, or an organization operation.

2. The computer storage medium of claim 1, wherein the holding area is hidden until the first user input is received.

3. The computer storage medium of claim 1, having further computer-executable instructions stored thereupon which, when executed by the computing device, cause the computing device to:
   receive fifth user input requesting to remove a selected one of the first visual representation or the second visual representation from the holding area;
   responsive to receiving the fifth user input, remove the selected one of the first visual representation or the second visual representation from the holding area; and
   delete the associated reference to the selected one of the first visual representation or the second visual representation.

4. The computer storage medium of claim 1, wherein the operation is performed on all files that have associated visual representations displayed in the holding area.

5. The computer storage medium of claim 1, wherein the holding area is displayed for a temporary period of time until the operation is performed.

6. The computer storage medium of claim 1, wherein the holding area is displayed persistently as the navigation area switches between multiple different storage locations.

7. The computer storage medium of claim 6, wherein the user interface further includes a selection area that enables the switching between the multiple different storage locations via displayed links.

8. A computer-implemented method, comprising:
   causing one or more first visual representations associated with one or more first files stored in a first storage location maintained by a file hosting service to be displayed in a navigation area of a user interface associated with a computing device;
   responsive to receiving first user input, at the computing device, that selects a first visual representation of the one or more first visual representations displayed in the navigation area:
      causing the first visual representation selected to be displayed in a holding area of the user interface; and
      storing a first reference that identifies a first file associated with the first visual representation selected;
   responsive to receiving second user input, at the computing device and while the holding area is displayed with the first visual representation, that selects a second storage location maintained by the file hosting service, causing one or more second visual representations associated with one or more second files stored in the second storage location maintained by the file hosting service to be displayed in the navigation area, wherein the one or more second visual representations replace the one or more first visual representations in the navigation area;

responsive to receiving third user input, at the computing device and while the holding area is displayed with the first visual representation, that selects a second visual representation of the one more second visual representations displayed in the navigation area:
causing the second visual representation selected to be displayed in the holding area; and
storing a second reference that identifies a second file associated with the second visual representation selected; and responsive to receiving fourth user input, at the computing device and while the holding area is displayed with the first visual representation and the second visual representation, that selects an operation, causing the file hosting service to perform the operation on both the first file identified by the first reference and the second file identified by the second reference, wherein the operation is one of a sharing operation, a transmission operation, or an organization operation.

9. The computer-implemented method of claim 8, wherein the operation is performed on all files that have associated visual representations displayed in the holding area.

10. The computer-implemented method of claim 8, wherein the holding area is displayed for a temporary period of time until the operation is performed.

11. The computer-implemented method of claim 8, wherein the holding area is displayed persistently as the navigation area switches between multiple different storage locations.

12. The computer-implemented method of claim 11, wherein the user interface further includes a selection area that enables the switching between the multiple different storage locations via displayed links.

13. A computing device, comprising:
at least one processor; and
a computer-readable storage medium having computer-executable instructions stored thereupon which, when executed by the at least one processor, cause the computing device to:
cause one or more first visual representations associated with one or more first files stored in a first storage location maintained by a file hosting service to be displayed in a navigation area of a user interface;

responsive to receiving first user input, at the computing device, that selects a first visual representation of the one or more first visual representations displayed in the navigation area:
cause the first visual representation selected to be displayed in a holding area of the user interface; and
store a first reference that identifies a first file associated with the first visual representation selected;

responsive to receiving second user input, at the computing device and while the holding area is displayed with the first visual representation, that selects a second storage location maintained by the file hosting service, cause one or more second visual representations associated with one or more second files stored in the second storage location maintained by the file hosting service to be displayed in the navigation area, wherein the one or more second visual representations replace the one or more first visual representations in the navigation area;

responsive to receiving third user input, at the computing device and while the holding area is displayed with the first visual representation, that selects a second visual representation of the one more second visual representations displayed in the navigation area:
cause the second visual representation selected to be displayed in the holding area; and
store a second reference that identifies a second file associated with the second visual representation selected; and responsive to receiving fourth user input, at the computing device and while the holding area is displayed with the first visual representation and the second visual representation, that selects an operation, cause the file hosting service to perform the operation on both the first file identified by the first reference and the second file identified by the second reference, wherein the operation is one of a sharing operation, a transmission operation, or an organization operation.

14. The computing device of claim 13, wherein:
the holding area is displayed persistently as the navigation area switches between multiple different storage locations; and
the user interface further includes a selection area that enables the switching between the multiple different storage locations via displayed links.

15. The computing device of claim 13, wherein the holding area is displayed for a temporary period of time until the operation is performed.

* * * * *